US012537305B2

(12) United States Patent
Beresnev

(10) Patent No.: US 12,537,305 B2
(45) Date of Patent: Jan. 27, 2026

(54) LAYERED NEAR FIELD COMMUNICATION ANTENNA

(71) Applicant: Senseonics, Incorporated, Germantown, MD (US)

(72) Inventor: Pavel Beresnev, Germantown, MD (US)

(73) Assignee: Senseonics, Incorporated, Germantown, MD (US)

( * ) Notice: Subject to any disclaimer, the term of this patent is extended or adjusted under 35 U.S.C. 154(b) by 233 days.

(21) Appl. No.: 18/366,832

(22) Filed: Aug. 8, 2023

(65) Prior Publication Data

US 2024/0055764 A1 Feb. 15, 2024

Related U.S. Application Data

(60) Provisional application No. 63/370,808, filed on Aug. 9, 2022.

(51) Int. Cl.
*H01Q 7/06* (2006.01)
*H01Q 7/00* (2006.01)

(52) U.S. Cl.
CPC .................................... *H01Q 7/06* (2013.01)

(58) Field of Classification Search
CPC ............... H01Q 1/38; H01Q 7/00; H01Q 7/06
See application file for complete search history.

(56) References Cited

U.S. PATENT DOCUMENTS 11,271,314 B2 * 3/2022 Ishizuka ................ H01Q 21/30
2009/0109104 A1 * 4/2009 Ide ........................... H01Q 9/26 343/730
2013/0201074 A1 * 8/2013 Harper ..................... H01Q 1/48 343/866
2014/0299667 A1 10/2014 Baek et al.
2015/0323696 A1 * 11/2015 Cole ........................ G01V 3/28 324/326
2016/0111787 A1 * 4/2016 Palm ...................... H01Q 21/24 343/788
2018/0179887 A1 6/2018 Clarkson
2018/0248255 A1 8/2018 Noh et al.
(Continued)

FOREIGN PATENT DOCUMENTS

EP 3937308 A1 1/2022

*Primary Examiner* — Thien M Le
(74) *Attorney, Agent, or Firm* — Rothwell, Figg, Ernst & Manbeck, P.C.

(57) ABSTRACT

Systems and apparatuses for near field communication with a receiver. An apparatus may include an antenna and one or more antenna printed circuit boards. The antenna may include first conductors in a first antenna layer and second conductors in one or more second antenna layers. A current supplied to the antenna may pass through the first conductors in a direction opposite to a direction through which the current passes through the second conductors. A system may include the apparatus and the receiver, which may include a receiver coil. The opposite directions through which the current passes through the first and second conductors may be substantially perpendicular to a longitudinal axis of the receiver coil. The antenna may generate a substantial magnetic flux that is a direction corresponding to the longitudinal axial of the receiver coil, which may be oriented parallel to a flat surface of the antenna.

37 Claims, 22 Drawing Sheets

(56) References Cited

U.S. PATENT DOCUMENTS

| | | | | |
|---|---|---|---|---|
| 2020/0004482 | A1* | 1/2020 | Khatib | G06F 3/1208 |
| 2020/0411953 | A1 | 12/2020 | Oh | |
| 2021/0051796 | A1* | 2/2021 | Heinisuo | H05K 1/0233 |
| 2022/0181772 | A1 | 6/2022 | Zhang | |
| 2022/0307865 | A1* | 9/2022 | Schmitt | G01D 5/142 |
| 2023/0021894 | A1* | 1/2023 | Okano | G06K 7/10435 |
| 2024/0154470 | A1* | 5/2024 | Serafimoska-Nedanovska | H04B 5/79 |

* cited by examiner

LAYERED NEAR FIELD COMMUNICATION ANTENNA

CROSS-REFERENCE TO RELATED APPLICATION

The present application claims the benefit of priority to U.S. Provisional Application Ser. No. 63/370,808, filed on Aug. 9, 2022, which is incorporated herein by reference in its entirety.

BACKGROUND

Field of Invention

The present invention relates generally to near field communication (NFC) antennas for communication and/or powering a remote receiver. In particular, aspects of the present invention relate to a flat NFC antenna for small cylindrical receiver with its axis and coil oriented parallel to the flat antenna surface.

Discussion of the Background

Magnetic Fields

FIG. 1A shows a cross-section of a conductor (e.g., wire) carrying an electric current in a first direction (e.g., forward or into the page) and the direction of the magnetic field generated by the current. FIG. 1B shows a cross-section of a conductor carrying an electric current in a second direction (e.g., backwards or out of the page) and the direction of the magnetic field generated by the current. FIGS. 1C and 1E show a cross-section of a group of conductors each carrying an electric current in the first direction, FIG. 1C shows the directions of the magnetic fields generated by each of the currents carried by the conductors of the group of conductors, and FIG. 1E shows the direction of the combined magnetic field generated by the currents of the group of conductors. FIGS. 1D and 1F show a cross-section of a group of conductors each carrying an electric current in the second direction, FIG. 1D shows the directions of the magnetic fields generated by each of the currents carried by the conductors of the group of conductors, and FIG. 1F shows the direction of the combined magnetic field generated by the currents of the group of conductors. FIG. 1G shows a cross-section of a group of conductors including both (a) conductors carrying electric currents in a first direction and (b) conductors carrying electric currents in a second direction and the directions of the magnetic field generated by the opposite-direction currents of the group of conductors.

Small-Factor NFC Antenna Design

An NFC antenna is typically a coil shaped to accomplish a certain task. For example, an NFC antenna may be operated at a center frequency of 13.56 MHz, and the NFC antenna may be size constrained to an area of 0.01 meter (m) to 0.1 m. For many applications, an NFC antenna may communicate with a remote device and/or supply power to the remote device (e.g., for the duration of communication). Maximizing flux linkage between NFC antenna and the remote device typically improves power efficiency and communication range. The power supplied by the NFC antenna to a remote device will be proportional to the square of the amplitude of electromagnetic field (EMF) that can be developed in the receiving coil of the remote device. The EMF is proportional to the derivative of flux linkage over time, as shown in the following equations:

$$\varepsilon = \frac{d\lambda}{dt} \quad \text{(Eq. 1)}$$

$$\lambda = \int_S \vec{B} \cdot d\vec{S}, \quad \text{(Eq. 2)}$$

which means that the EMF is proportional to the speed of changing magnetic flux through the receiving coil of the remote device, and the integral of incoming magnetic flux density vector dot-product with the normal to the surface of the coil across the entire surface of the coil. As the frequency is fixed by regulatory allocation, flux linkage may be maximized by decreasing distance and/or increasing the area of the coil that receives magnetic flux with vectors oriented in the same direction relative to the normal of the coil. This can be done by adding turns to the coil, and the flux linkage equation then simplifies to the equation for a single loop multiplied with N, where N is the number of turns in the coil, as shown below:

$$\lambda = N\Phi \quad \text{(Eq. 3)}$$

Many antennas are optimized (i) to be wide and flat, (ii) to communicate with remote devices which are also wide and flat, and (iii) with sizes and dimensions similar to a credit card or a public transport pass. Flux linkage in those cases is maximized by adding turns and making sure that transmitter antenna and remote device are properly aligned. In this case, flux linkage is accomplished through coaxial fields lines that are normal to the surface of the flat coil and represent the "poles" of the instantaneous magnet generated by the coil. The receiving coil is then positioned parallel to the transmitter coil and receives most of its magnetic field lines before they begin to curve to the side.

In the special case when the remote device is not wide and flat and cannot be oriented with its poles normal to the surface of the transmitter, different antenna shapes are used. For example, if the receiving device is a long cylinder with a helical coil winding along its axis, and the coil can only be positioned parallel to the antenna, one can no longer use field lines directly at the poles. Instead, curved field lines are used to power the coil. This can be accomplished by transforming the transmitter antenna into a coil similar to the receiver coil but larger. Then, field lines emanating at the poles will curve around and become axial to the receiver coil. However, simply creating a cylinder in the transmitter may not be feasible if the transmitter is limited in size and shape (e.g., if it has to be built as a printed circuit board (PCB)).

Flat NFC Antenna Structures

For typical small NFC antennas (e.g., 0.01 m to 0.1 m with 10 to 20 turns), the number of turns and the size of the NFC antenna mean that the entire antenna structure is roughly at the same phase when driven by 13.56 MHz. This is because the wavelength at 13.56 MHz is about 22 meters, the half-wavelength is 11 meters, and the copper equivalent is only slightly smaller. Most phase shifts can be assumed to occur in the matching network leading up to the antenna. The antenna can thus be analyzed in terms of overlapping magnetic fields in space created by finite current-carrying conductors in the antenna structure. Conductors that are close together and carry current in the same direction will create parallel magnetic field lines that will superimpose to produce stronger flux and improve flux linkage for any receiving coil placed normal to those field lines. However, electric currents must travel through closed circuits, and so for every conductor that travels in one direction, there will be a conductor carrying the same amount of current in the opposite direction. Magnetic field lines from conductors carrying currents in the opposite direction will destructively interfere with the former field lines and will potentially cancel them out. To mitigate this, various approaches are used, such as shielding returning conductors with ferrimagnetic materials (e.g., ferrite), spatially separating conductors carrying currents in one direction from conductors carrying currents in the opposite direction (as shown in FIG. 1G), and/or timing their phase inversion such that their interference becomes constructive instead of destructive. The approach of timing phase inversion such that their interference becomes constructive requires an antenna that is electrically large (e.g., about half wavelength), which is difficult to achieve in a small size. This means that, for a small size antenna, a combination of the first two approaches is used.

Flat NFC Antennas and Their Compatibility with a Small Cylindrical Receiver Coil FIGS. 2A, 2B, 3A, and 3B illustrate a cross-section of an existing flat NFC antenna 202 including a flat transmitter coil 204, the direction of an electrical current carried by the transmitter coil 204, and the direction of a magnetic field generated by the current carried by the transmitter coil 204. FIG. 2A additionally illustrates a cross-section of a receiver 206*a* including a flat receiver coil 208*a*, and the direction of an electrical current induced in the receiver coil 208*a* by the magnetic field generated by the current carried by the transmitter coil 204. FIG. 2B additionally illustrates a cross-section of a receiver 206*b* including a cylindrical receiver coil 208*b*, and the direction of an electrical current induced in the receiver coil 208*b* by the magnetic field generated by the current carried by the transmitter coil 204. As shown in FIGS. 2A and 2B, the existing flat NFC antenna 202 and receiver 206*a* or 206*b* use coaxial flux linkage. That is, the transmitter coil 204 of the NFC antenna 202 and the receiver coil 208*a* or 208*b* of the receiver 206*a* or 206*b* are expected to be aligned approximately along the same axis. The existing flat antenna 202 will work at medium range for receivers 206*a* and 206*b* that are placed such that their axis is perpendicular to the conductors of the transmitter coil 204 and coaxial with the magnetic field generated by the electrical current carried by the conductors of the transmitter coil 204.

FIGS. 3A and 3B illustrates a cross-section of a receiver 306 including a cylindrical receiver coil 308. As shown in FIGS. 3A and 3B, the axis of the transmitter coil 204 of the NFC antenna 202 is perpendicular to the axis of the receiver coil 308 of the receiver 306. That is, in FIGS. 3A and 3B, the axis of the receiver coil 308 of the receiver 306 is horizontally oriented relative to the vertical orientation of the axis of the transmitter coil 204 of the NFC antenna 202.

FIG. 3A shows the receiver 306 located at the center of the magnetic field generated by the electrical current carried by the conductors of the transmitter coil 204. FIG. 3A illustrates the direction of an electrical current that the magnetic field generated by the current carried by the transmitter coil 204 attempts to induce in the receiver coil 308 of the receiver 306. However, as shown in FIG. 3A, with the receiver 306 located at the center of the magnetic field generated by the electrical current carried by the conductors of the transmitter coil 204, the magnetic field generated by the electrical current carried by the conductors of the transmitter coil 204 is unable to induce an electrical current in the receiver coil 308 of the receiver 306 (or is only able to generate a small current if the receiver 306 is not exactly at the center).

FIG. 3B shows the receiver 306 located at different locations far off the center of the magnetic field generated by the electrical current carried by the conductors of the transmitter coil 204. As shown in FIG. 3B, with the receiver 306 located far off the center of the magnetic field generated by the electrical current carried by the conductors of the transmitter coil 204, the magnetic field generated by the electrical current carried by the conductors of the transmitter coil 204 is able to induce an electrical current in the receiver coil 308 of the receiver 306. FIG. 3B illustrates the direction of the electrical current induced in the receiver coil 308 of the off-center receiver 306 by the magnetic field generated by the current carried by the transmitter coil 204. That is, as illustrated in FIGS. 3A and 3B, the horizontally oriented receiver coil 308 of the receiver 306 cannot be used with the transmitter coil 204 of the NFC antenna 202 unless the receiver 306 is located far off the center of the magnetic field generated by the current carried by the transmitter coil 204.

A ferrite sheet backing may improve the performance of the NFC antenna 202 and prevent magnetic flux from affecting electronics on the other side of the NFC antenna 202.

FIGS. 4A and 4C illustrates a cross-sectional view of a system including an apparatus 402 and a receiver 306. The apparatus 402 includes an antenna 404, an antenna printed circuit board (PCB) 410, a ferromagnetic layer 416, a circuit component PCB 412, a connector 414 between the antenna PCB 410 and the circuit component PCB 412, and one or more circuit components 418, 420, and 422 mounted on or fabricated in the circuit component PCB 412. The one or more circuit components may include a processor 418 and a computer readable medium (CRM) 420 (e.g., a flash memory). FIG. 4B illustrates the antenna 404. As shown in FIG. 4B, the antenna 404 includes first and second antenna differential feeds 424 and 426 through which a current is supplied to the antenna 404. As shown in FIGS. 4A-4C, the antenna 404 includes first and second conductors 404*a* and 404*b*, which run substantially perpendicular to the axis of the receiver coil 308 of the receiver 306. As shown in FIG. 4B, the antenna 404 additionally includes third conductors 404*c* that connect the first and second conductors 404*a* and 404*b* and run substantially parallel to the axis of the receiver coil 308 of the receiver 306. As shown in FIG. 4B, the antenna 404 additionally includes wires 428, 430, and 432 (e.g., PCB traces).

As shown in FIGS. 4A-4C, the antenna 404 includes the first conductors 404*a* and second conductors 404*b* in a single layer. As shown in the FIGS. 4A and 4C, a current supplied to antenna 404 passes through the first conductors 404*a* in a direction opposite to a direction through which the current passes through the second conductors 404*b*. The opposite directions through which the current supplied to the antenna 404 passes through the first and second conductors 404*a* and 404*b* are perpendicular to the axis of the receiver coil 308 of the receiver 306. As shown in FIGS. 4A-4C, the first conductors 404*a* are located in the center of the antenna 404 between the second conductors 404*b* at the right and left edges of the antenna 404. As shown in FIG. 4B, the first conductors 404*a* are also located between the conductors of the antenna 404 that connect the first and second conductors 404*a* and 404*b* at the top and bottom edges of the antenna 404.

The magnetic field generated by the electrical current carried by the first and second conductors 404*a* and 404*b* of the antenna 404 is shown in FIGS. 4A and 4C. The ferromagnetic layer 416 contributes to the optimal performance of the apparatus 402. As shown in FIG. 4A, with the receiver 306 located at the center of the magnetic field generated by the electrical current carried by the first conductors 404*a* of the transmitter antenna 404, the receiver 306 gets a good signal, and the magnetic field generated by the electrical current carried by the first conductors 404*a* of the transmitter antenna 404 is able to induce an electrical current in the receiver coil 308 of the receiver 306.

As shown in FIG. 4C, if the receiver coil 308 of the receiver 306 is located between the magnetic fields generated by the electrical current carried by the first and second conductors 404*a* and 404*b* of the transmitter antenna 404, the magnetic fields generated by the electrical current carried by the first and second conductors 404*a* and 404*b* of the transmitter antenna 404 is not able to induce an electrical current in the receiver coil 308 of the receiver 306. That is, the receiver 306 loses signal when shifted a small distance away from the center, which makes it easy for the apparatus 402 and receiver 306 to lose connection. As shown in FIG. 4C, if the receiver coil 308 of the receiver 306 is instead located completely in the magnetic field generated by the electrical current carried by the second conductors 404*b* of the transmitter antenna 404, the magnetic field generated by the electrical current carried by the first conductors 404*a* of the transmitter antenna 404 may be able to induce a small electrical current in the receiver coil 308 of the receiver 306. That is, the receiver 306 gets a weak signal far off-center, which may be confusing to a user (e.g., that is trying to place the receiver 306 at the center).

It is noted that the magnetic field generated by the third conductors 404*c* of the antenna 404 that connect the first and second conductors 404*a* and 404*b* and run in a direction substantially parallel to the axis of the receiver coil 308 of the receiver 306 are not shown in FIGS. 4A and 4C, as these magnetic fields are orthogonal to the axis of the receiver coil 308 of the receiver 306 and do not contribute to generating a current in the receiver coil 308 of the receiver 306.

SUMMARY

Aspects of the invention may improve the area coverage and range of a flat near field communication (NFC) antenna, which may be driven differentially and operate at, for example and without limitation, 13.56 MHz, by improving flux linkage and area efficiency. Aspects of the invention may additionally or alternatively improve area efficiency of an antenna by covering a wider area with current-carrying conductors that have constructively overlapping magnetic fields. Aspects of the invention may additionally or alternatively improve antenna range by lowering resistance of the antenna coil, moving return-current conductors further away from the active area, and/or covering up the return-current wires with one or more ferromagnetic strips. Aspects of the invention may result in significant improvements in antenna performance One aspect of the invention may provide an apparatus including an antenna. The antenna may include first and second conductors. The first conductors may be in a first antenna layer. The second conductors may be in one or more second antenna layers different than the first antenna layer. A current supplied to the antenna may pass through the first conductors in a direction opposite to a direction through which the current passes through the second conductors.

In some aspects, the apparatus may further include an antenna printed circuit board (PCB). In some aspects, the first conductors may be printed on a bottom surface of the antenna PCB. In some aspects, the antenna PCB may include antenna vias, and each of the antenna vias may connect electrically a conductor of the second conductors to a conductor of the first conductors. In some aspects, the first conductors in the first antenna layer, conductors in the one or more second antenna layers, and the antenna vias may form a coil, and the conductors in the one or more second antenna layers include at least the second conductors.

In some aspects, the second conductors may be printed on an upper surface of the antenna PCB and/or fabricated in one or more layers of the antenna PCB.

In some aspects, the second conductors may include second conductors located at a first edge of the antenna PCB and second conductors located at a second edge of the antenna PCB that is opposite the first edge. In some aspects, the apparatus may include a first ferromagnetic strip located under the second conductors located at the first edge of the antenna PCB and a second ferromagnetic strip located under the second conductors located at the second edge of the antenna PCB.

In some aspects, the apparatus may further include a ferromagnetic layer above the antenna PCB. In some aspects, the apparatus may further include a circuit component PCB and one or more circuit components mounted on or fabricated in the circuit component PCB. In some aspects, the ferromagnetic layer may be in between the circuit component PCB and the antenna PCB.

In some aspects, the second conductors may be located at one edge of the antenna PCB. In some aspects, the apparatus may further include a ferromagnetic strip located above the second conductors at one edge of the antenna PCB.

In some aspects, the antenna may further include a ferromagnetic layer in between the first conductors and the second conductors.

In some aspects, the antenna PCB may be a first antenna PCB, the antenna may further include a second antenna PCB, the first conductors may be printed on or fabricated in the first PCB antenna, and the second conductors may be printed on and/or fabricated in the second PCB antenna. In some aspects, the apparatus may further include one or more circuit components mounted on or fabricated in the second antenna PCB. In some aspects, the first and second antenna PCBs may be part of a combined PCB, and the ferromagnetic layer may be an internal layer within the combined PCB.

In some aspects, a cross-sectional area of the first conductors may be greater than a cross-sectional area of the second conductors. In some aspects, the apparatus may further include first and second antenna feeds, a first feed conductor in a layer of the one or more second antenna layers that connect electrically the first antenna feed to a first outer conductor of the first conductors at a first antenna end of the first outer conductor, and a second feed conductor in a layer of the one or more second antenna layers that connect electrically the second antenna feed to a second outer conductor of the first conductors at a second antenna end of the second outer conductor, and the first and second antenna ends may be at opposite ends of the antenna.

In some aspects, after passing through one conductor of the first conductors, the current supplied to the antenna may pass through one conductor of the second conductors before passing through another conductor of the first conductors. In some aspects, after passing through one conductor of the second conductors, the current supplied to the antenna may pass through one conductor of the first conductors before passing through another conductor of the second conductors.

In some aspects, the current passing through the first conductors may generate constructively overlapping magnetic fields. In some aspects, the current passing through the second conductors may generate magnetic fields capable of interfering destructively with magnetic fields generated by the current passing through the first conductors. In some aspects, the current passing through the second conductors may be a return current.

In some aspects, the first antenna layer does not include a conductor through which the current supplied to the antenna passes in a direction opposite to the direction in which the current supplied to the antenna passes through the first conductors. In some aspects, the antenna may further include third conductors in the one or more second antenna layers, and the third conductors may connect the first and second conductors. In some aspects, the antenna may include two or more second antenna layers, and the second conductors may be in the two or more second antenna layers.

Another aspect of the invention may provide a system including the apparatus of any one of the aspects above and a receiver coil.

In some aspects, the opposite directions through which the current passes through the first and second conductors may be substantially perpendicular to a longitudinal axis of the receiver coil. In some aspects, the first and second conductors may run in directions substantially perpendicular to a longitudinal axis of the receiver coil. In some aspects, the antenna may further include third conductors in the one or more second antenna layers, and the third conductors may connect the first and second conductors and run in directions substantially parallel to a longitudinal axis of the receiver coil. In some aspects, a longitudinal axis of the receiver coil may be parallel to a flat surface formed by the first conductors in the first antenna layer.

Still another aspect of the invention may provide a method including supplying a current to an antenna. The current supplied to the antenna may pass through first conductors in a first antenna layer of the antenna in a direction opposite to a direction through which the current passes through second conductors in one or more second antenna layers of the antenna different than the first antenna layer.

In some aspects, the current passing through the first conductors may generate constructively overlapping magnetic fields. In some aspects, the current passing through the second conductors may be a return current. In some aspects, the opposite directions through which the current passes through the first and second conductors may be substantially perpendicular to a longitudinal axis of a receiver coil. In some aspects, the first and second conductors may run in directions substantially perpendicular to a longitudinal axis of a receiver coil. In some aspects, a longitudinal axis of a receiver coil may be parallel to a flat surface formed by the first conductors in the first antenna layer. In some aspects, the current may be an alternating current.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION OF PREFERRED EMBODIMENTS

Figure 5A:
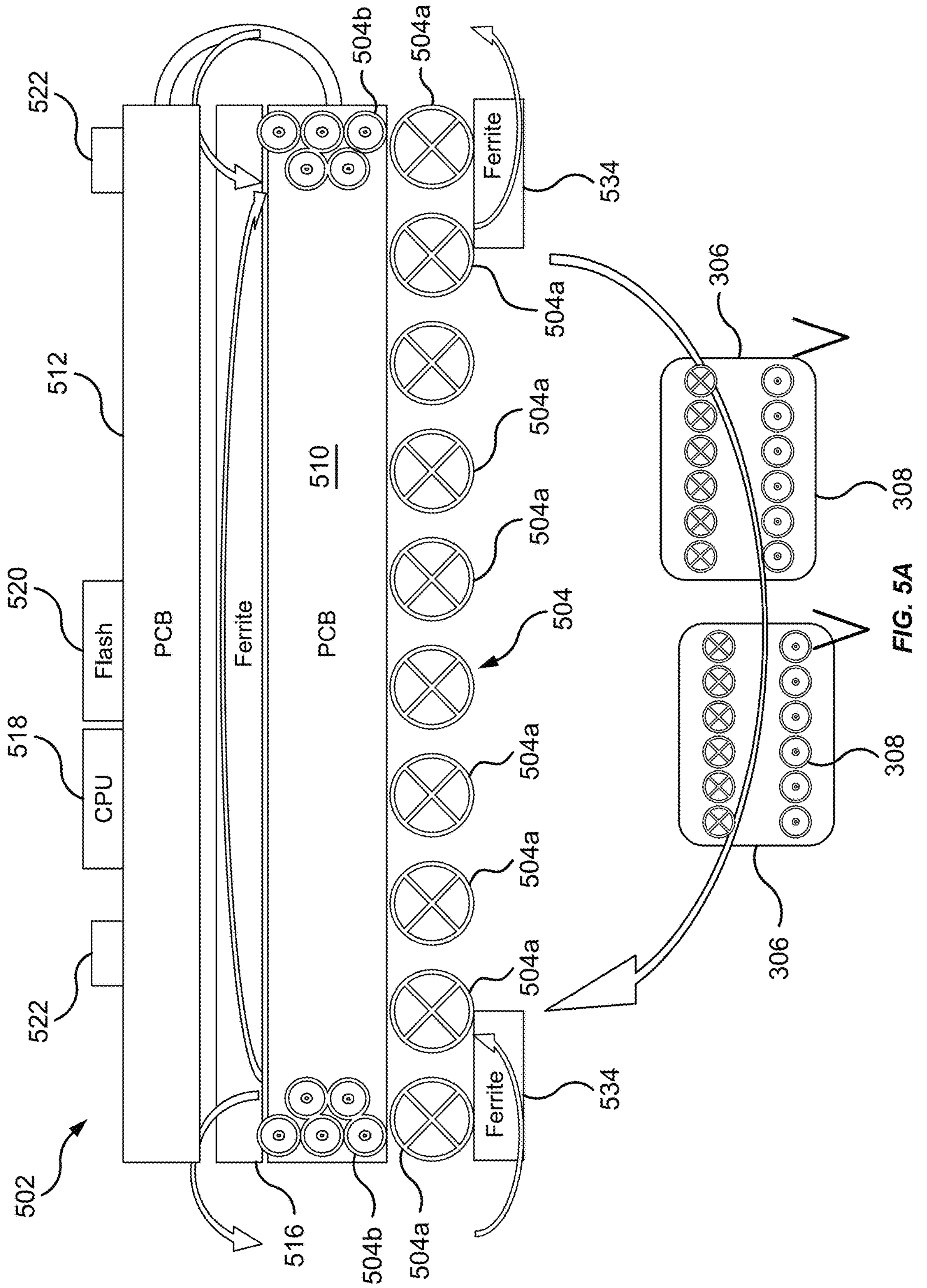
FIG. 5A is a cross-sectional view of a system including an apparatus having a flat NFC antenna with a multi-layer transmitter coil and a receiver having a receiver coil according to some aspects.
Figure 5B:
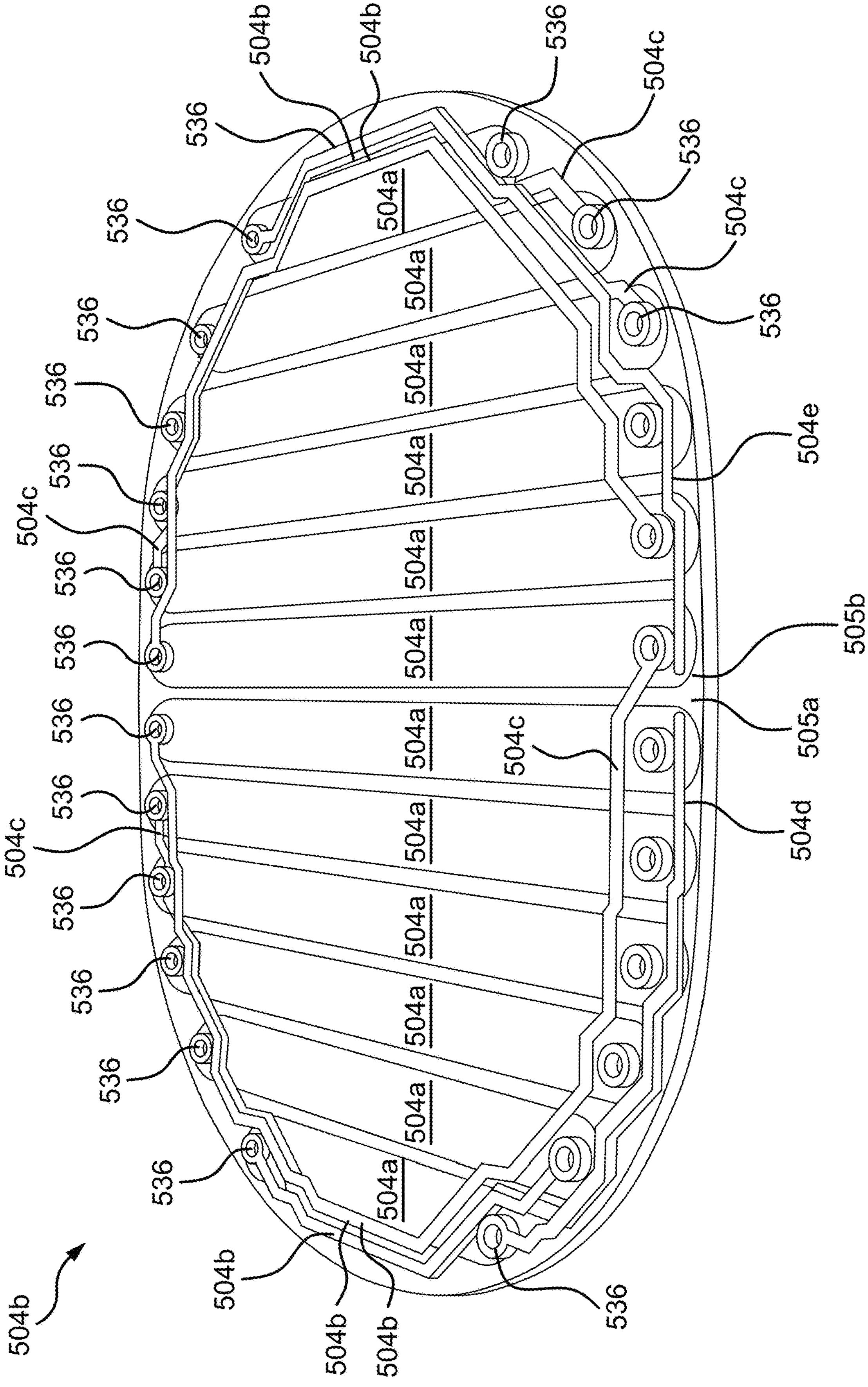
FIGS. 5B-5E are perspective, expanded, bottom, and bottom views, respectively, of the multi-layer transmitter coil according to some aspects.

FIG. 5A is a cross-sectional view illustrating a system including an apparatus 502 and a receiver 306 according to some aspects. The receiver 306 may include a receiver coil 308. In some aspects, the apparatus 502 may include an antenna 504, an antenna printed circuit board (PCB) 510, one or more ferromagnetic layers 516, a circuit component PCB 512, a connector 514 between the antenna PCB 510 and the circuit component PCB 512, and/or one or more circuit components 518, 520, and 522 mounted on or fabricated in the circuit component PCB 512. In some aspects, the one or more circuit components 518, 520, and 522 may include a processor 518 (e.g., a central processing unit (CPU)) and a computer readable medium (CRM) 520 (e.g., a flash memory). In some aspects, as shown in FIG. 5A, the apparatus 502 may additionally or alternatively include one or more ferromagnetic (e.g., ferrite) strips 534 located at one or more of first (e.g., left) and second (e.g., left) edges of the antenna 504. However, the one or more ferromagnetic strips 534 are not required, and, in some alternative aspects, the apparatus 502 may not include the one or more ferromagnetic strips 534.

Figure 5C:
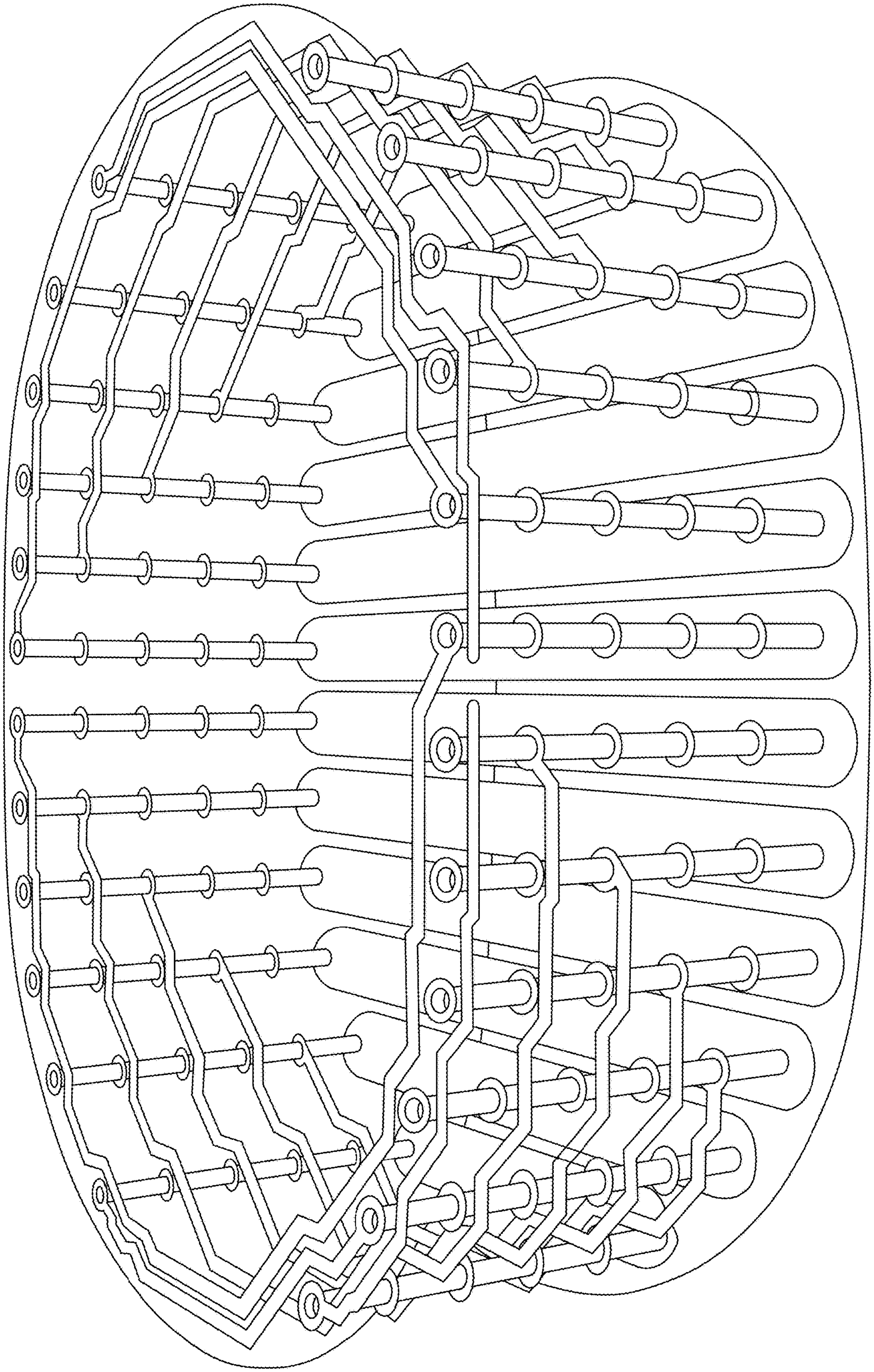
Figure 5D:
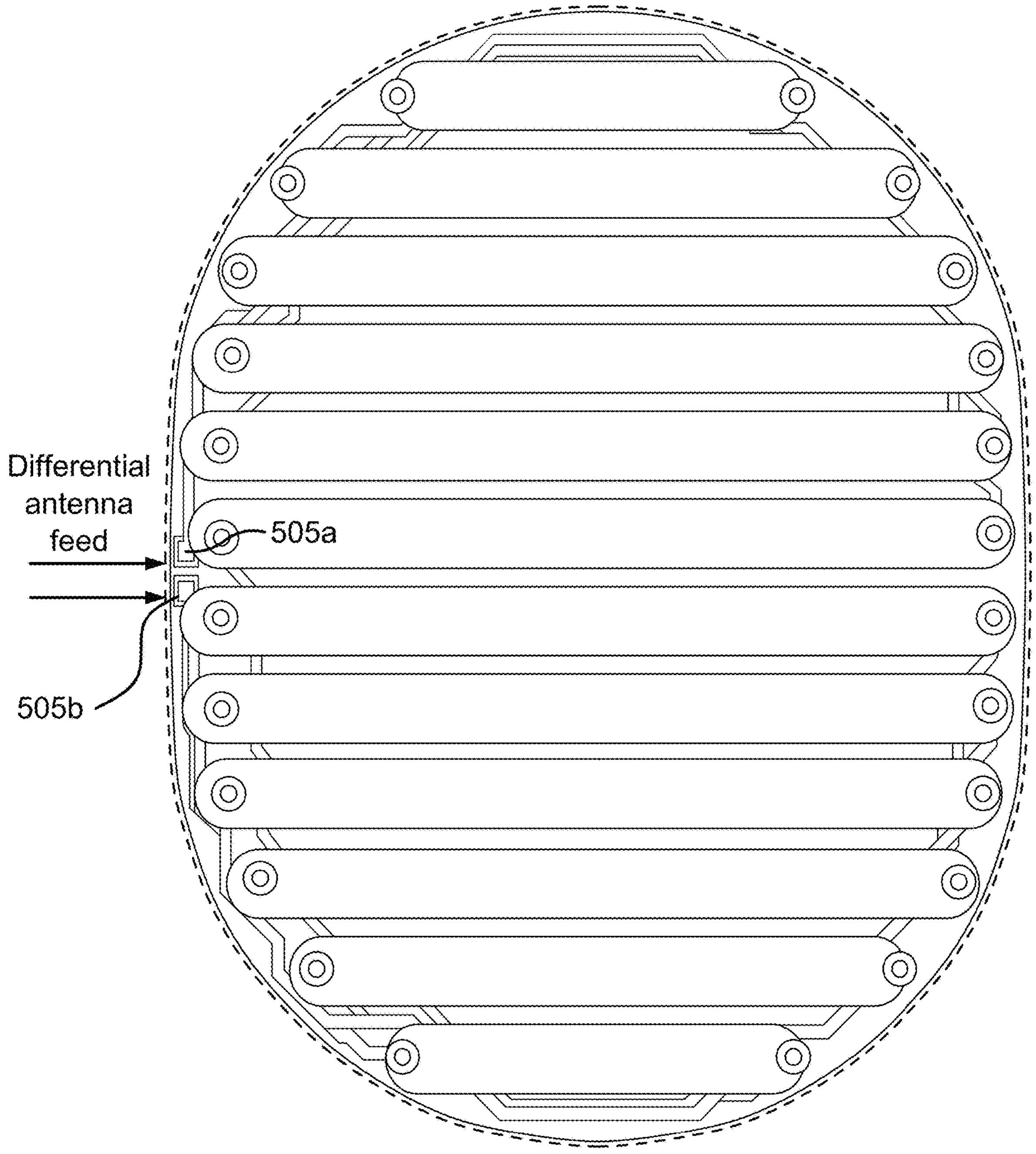
Figure 5E:
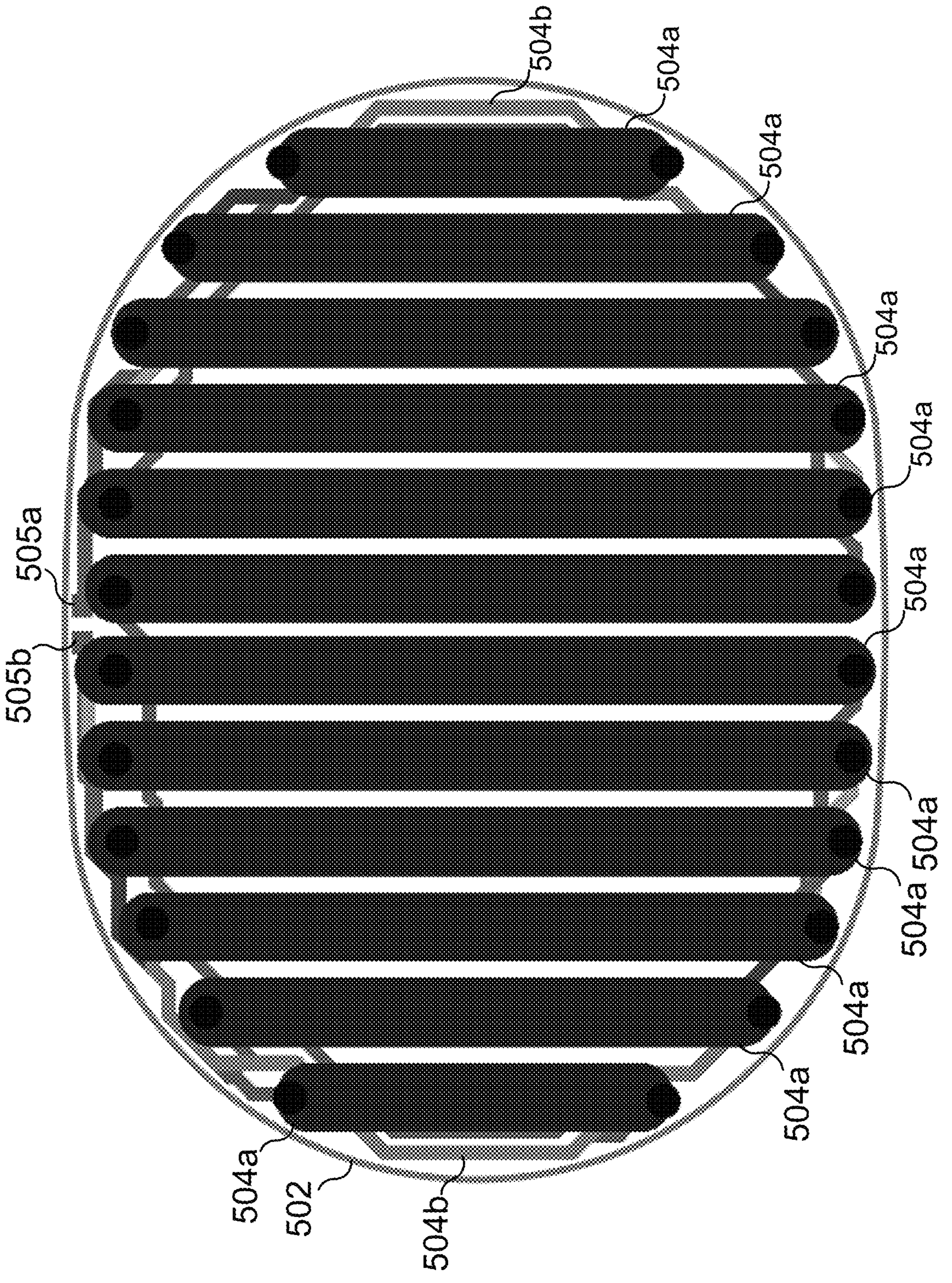
Figure 5F:
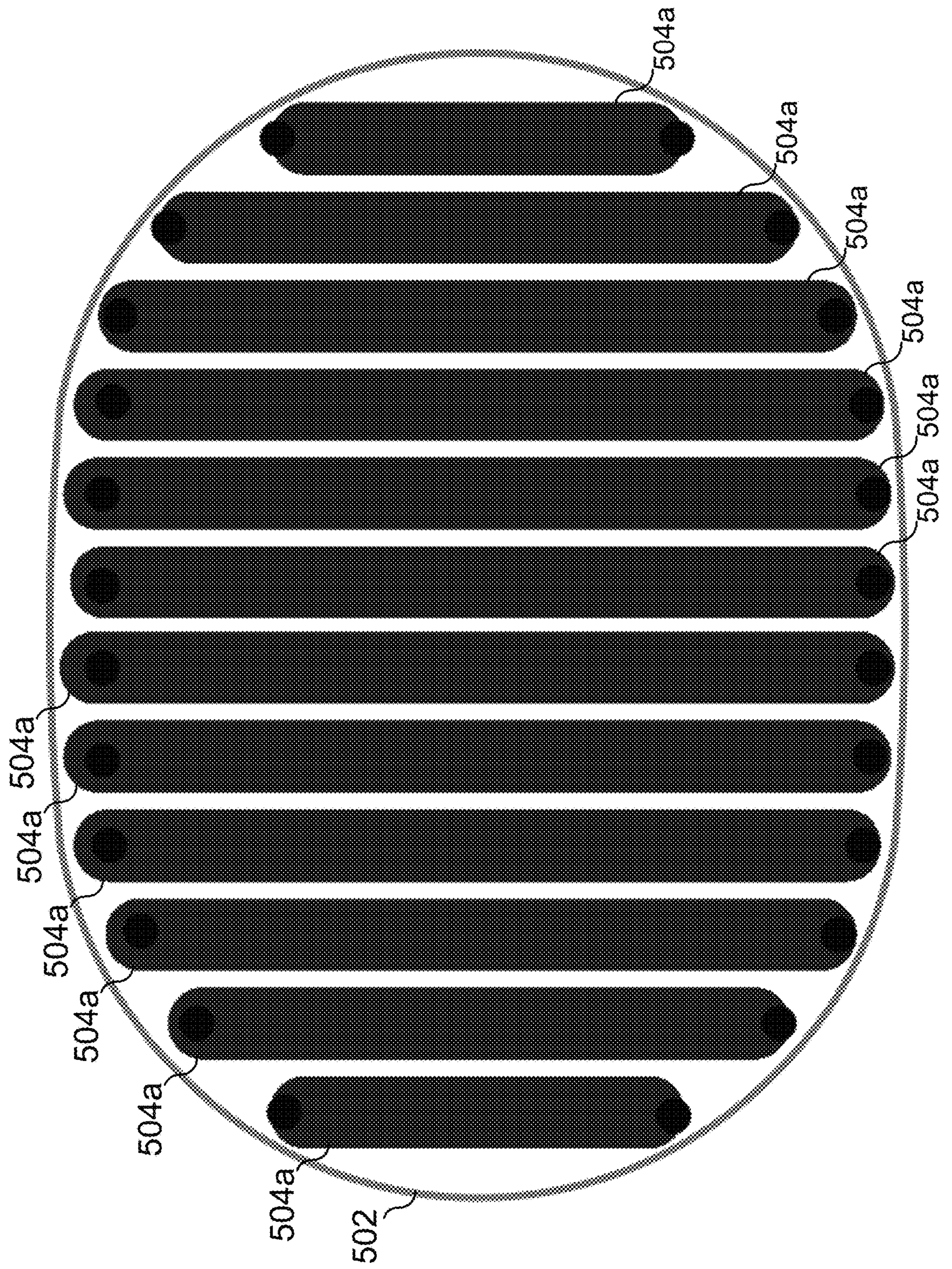
FIG. 5F illustrates first conductors in a first antenna layer of the multi-layer transmitter coil according to some aspects.
Figure 5G:
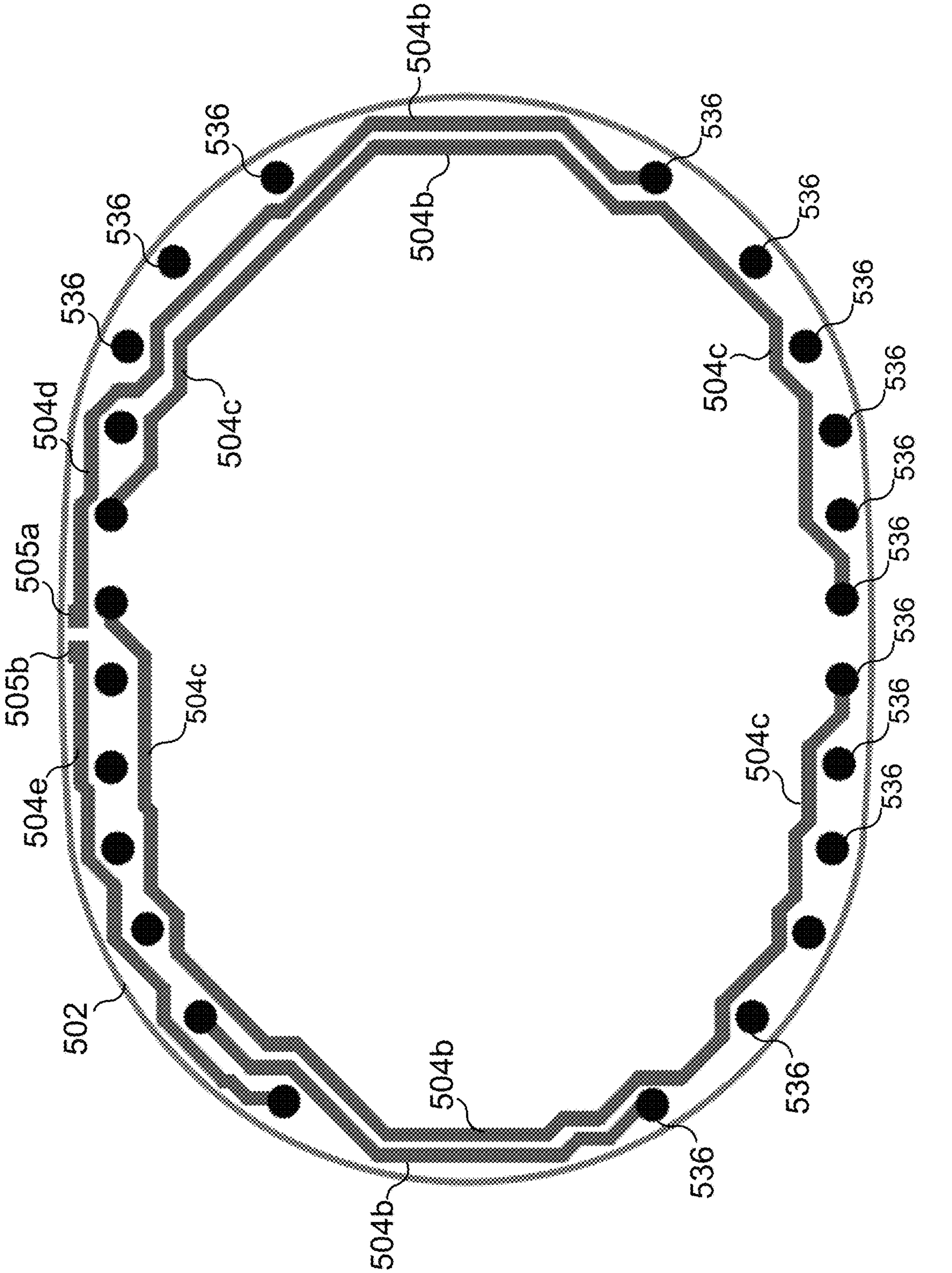
FIGS. 5G-5K illustrate second conductors in second antenna layers of the multi-layer transmitter coil according to some aspects.
Figure 5H:
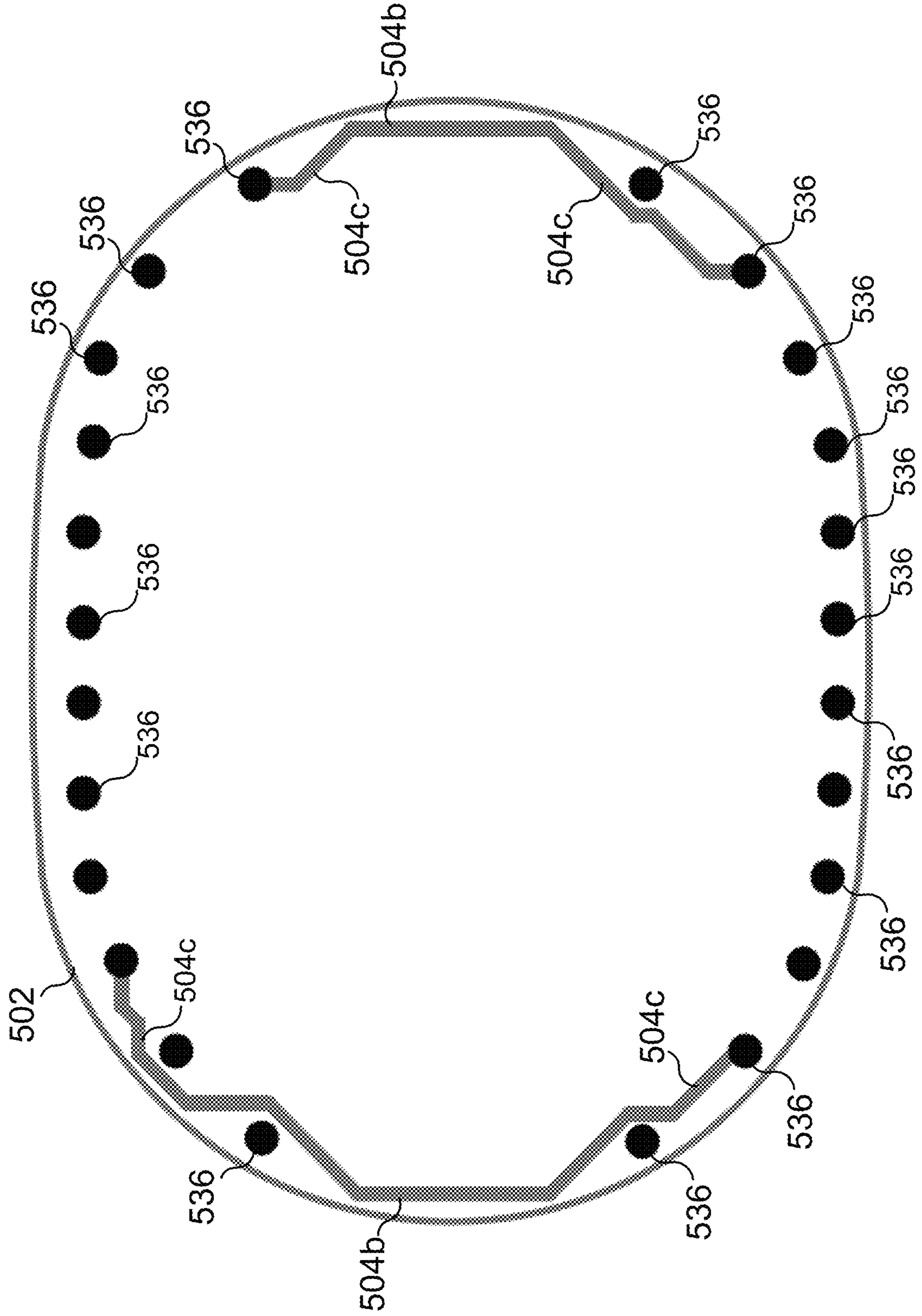
Figure 5I:
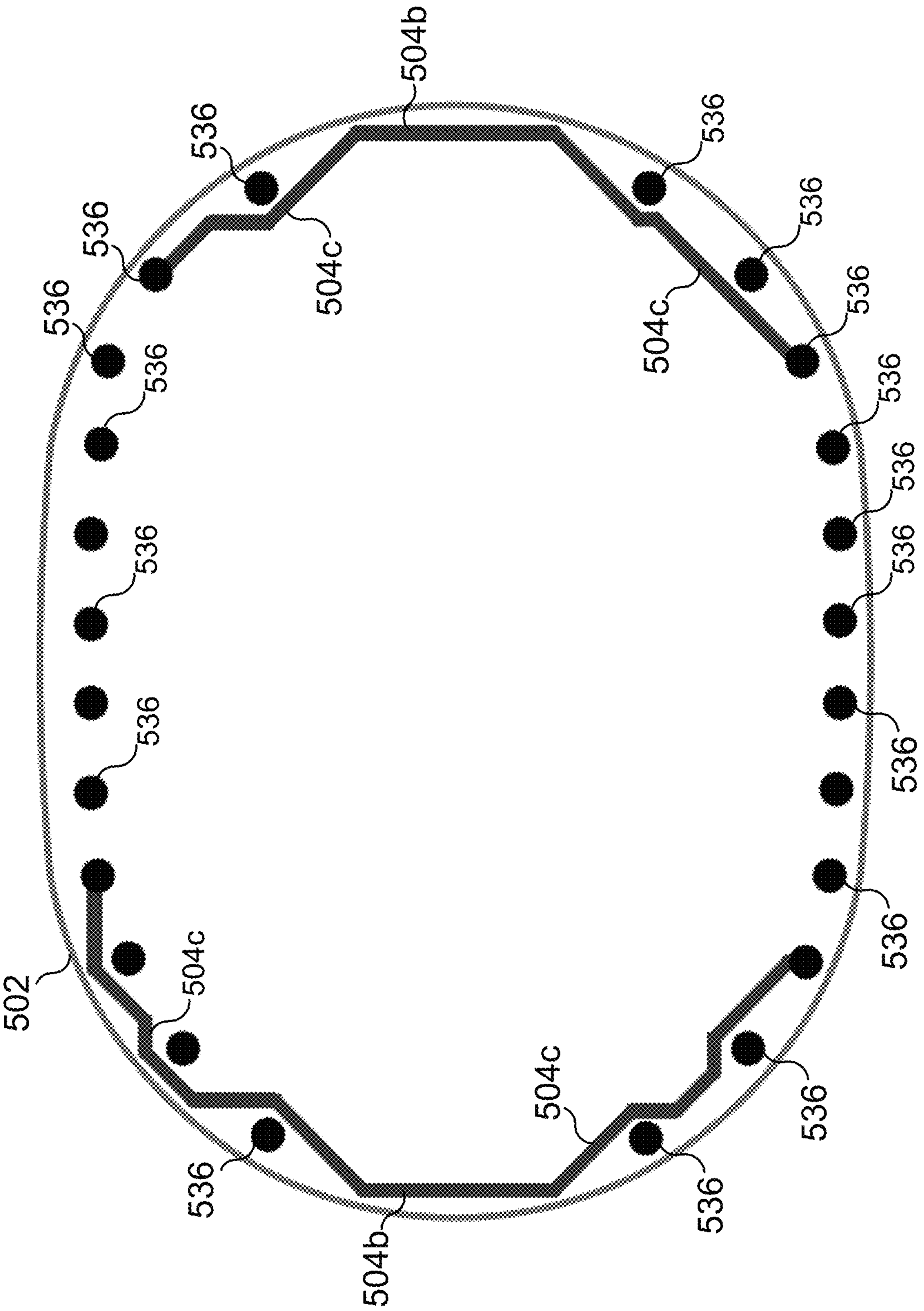
Figure 5J:
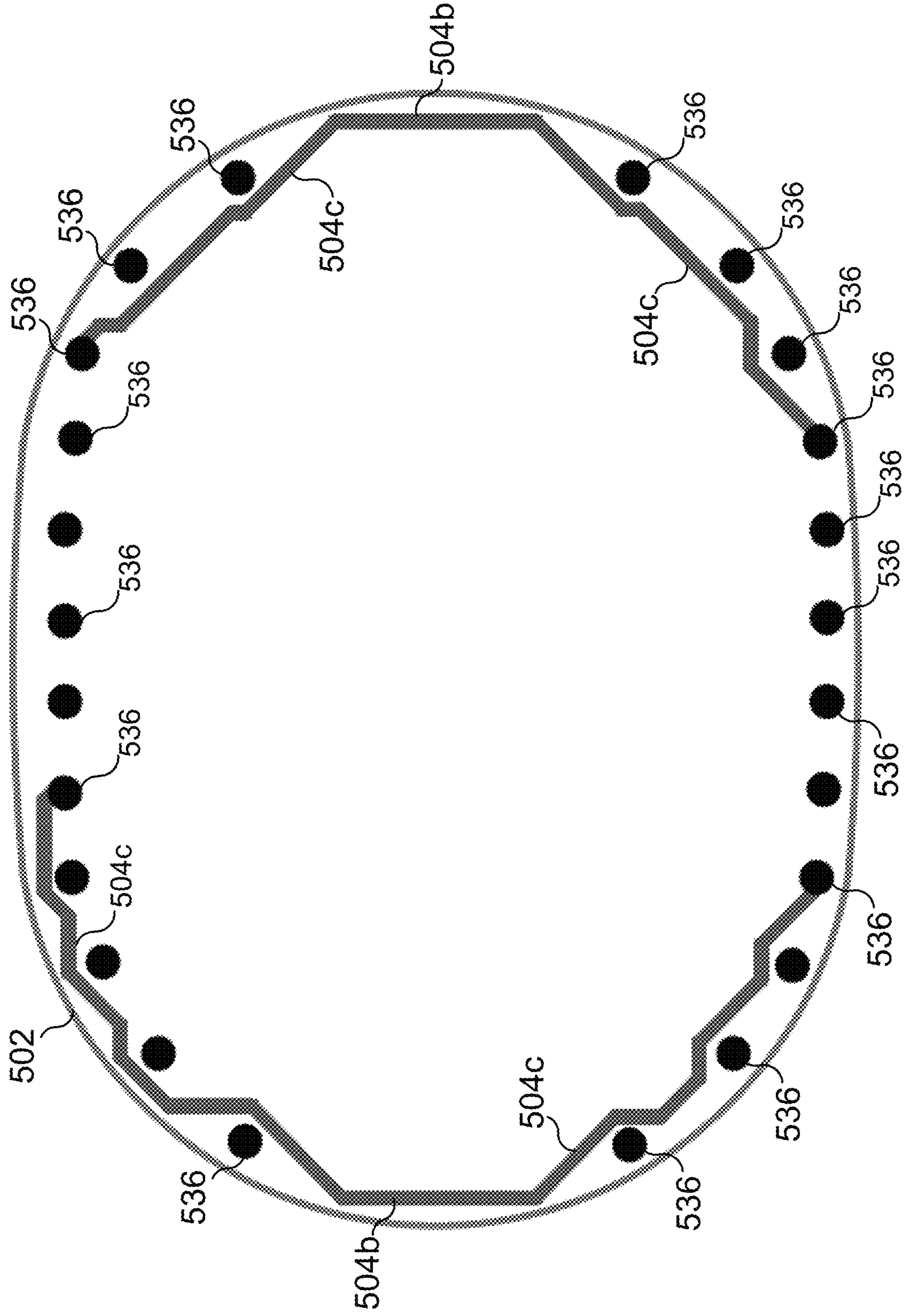
Figure 5K:
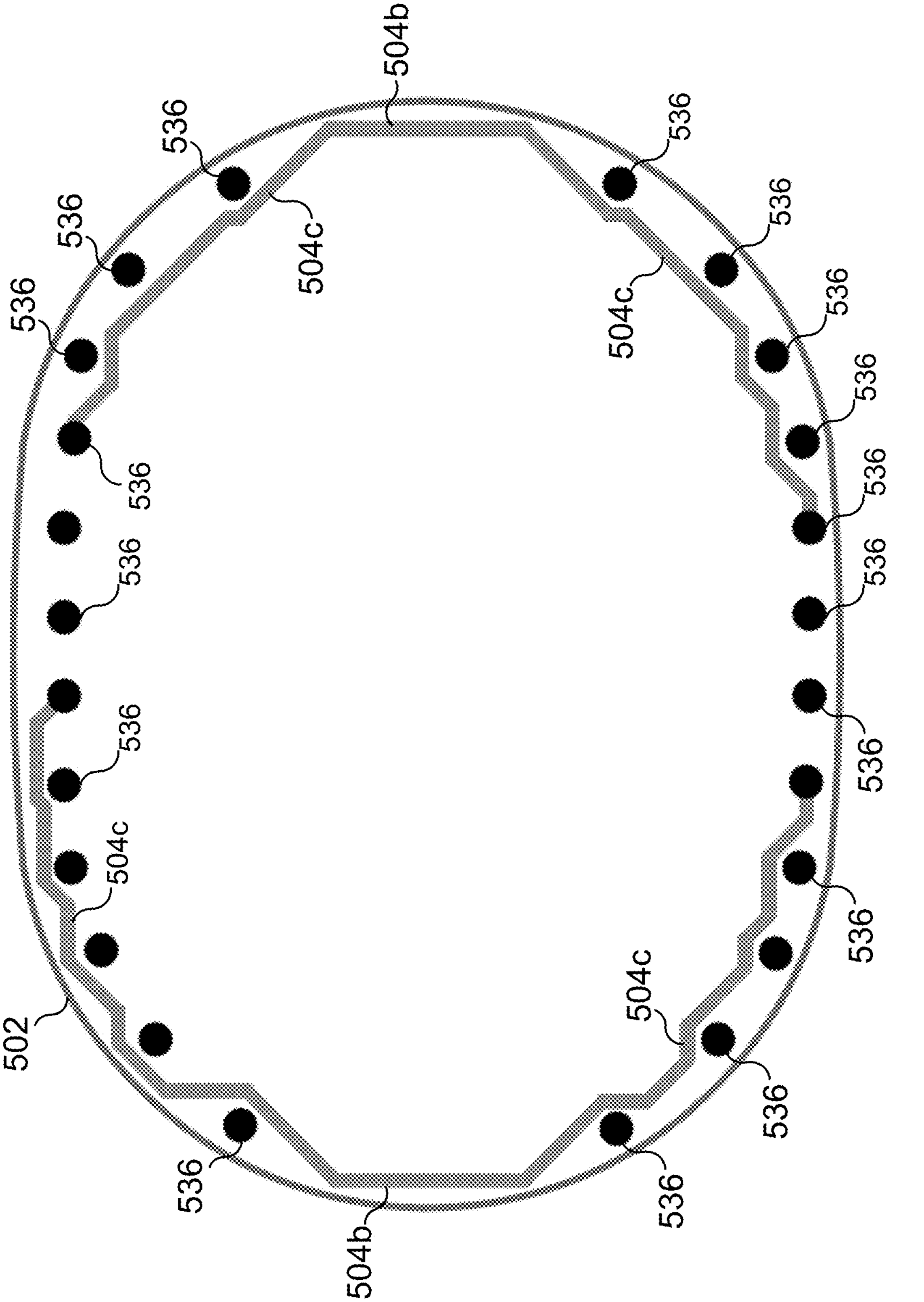
Figure 5L:
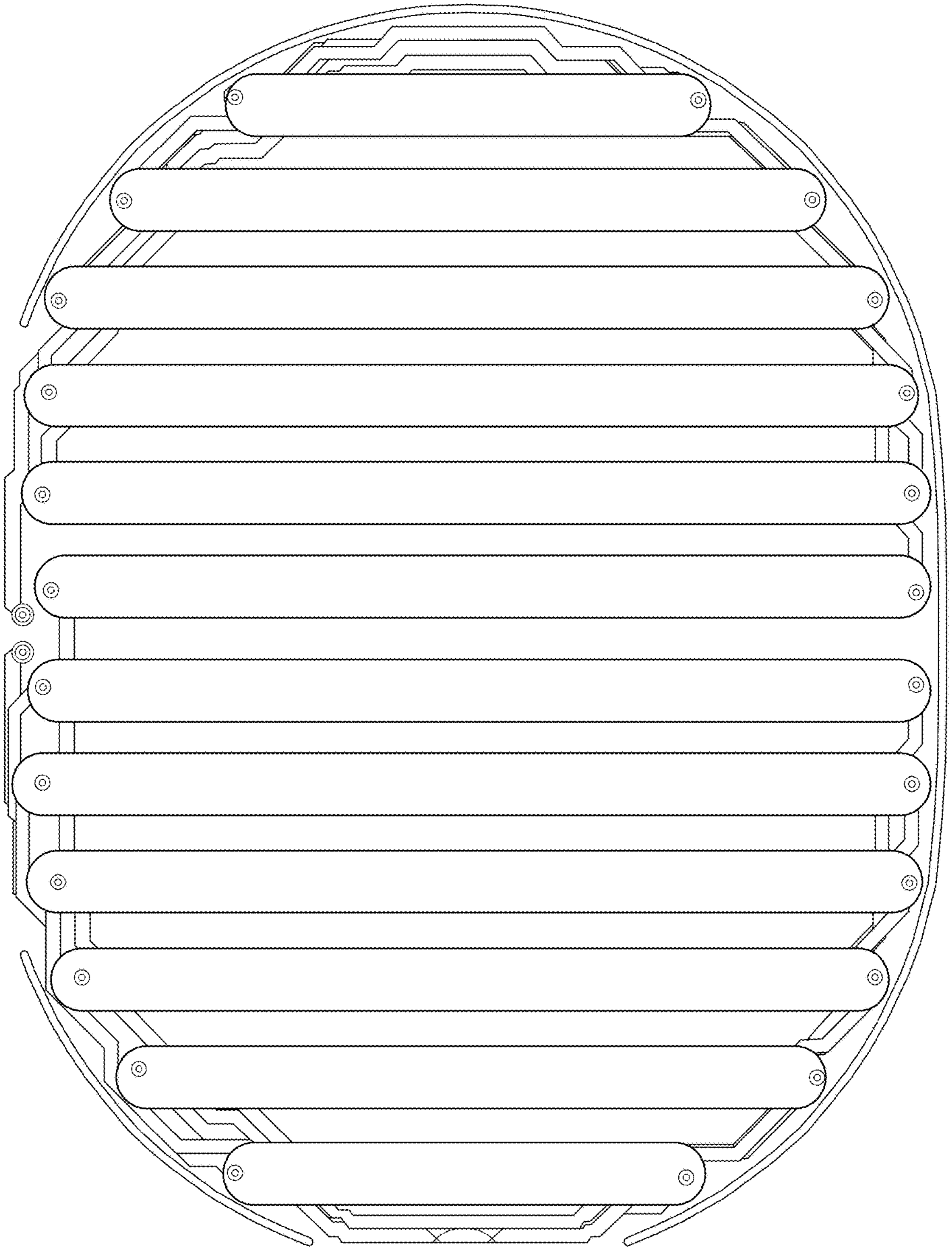
FIG. 5L is a bottom view of the multi-layer transmitter coil according to some aspects.

FIGS. 5B-5E and 5L are perspective, expanded, bottom, bottom, and bottom views, respectively, of the antenna 504 according to some aspects. In some aspects, as shown in FIGS. 5A-5F and 5L, the antenna 504 may include first conductors 504*a* (shown in red in FIGS. 5B-5D and 5L) in a first antenna layer. FIG. 5F illustrates first conductors 504*a* in the first antenna layer according to some aspects. In some aspects, as shown in FIGS. 5A-5E and 5G-5L, the antenna 504 may include conductors (shown in royal blue, light purple, light blue, yellow, and light green in FIGS. 5B-5D and 5L) in one or more second antenna layers. FIGS. 5G-5K illustrate the conductors in the second antenna layers according to some aspects. In the illustrated embodiments, the antenna 504 includes five second antenna layers. However, this is not required, and, in some alternative aspects, the antenna 504 may include a different number of second antenna layers (e.g., 1, 2, 3, 4, 6, 7, 8, 12, 20, etc.). In some aspects, as shown in FIGS. 5B-5L, the antenna 504 may include antenna vias 536 that connect electrically the first conductors 504*a* of the first antenna layer with one or more conductors of the one or more second antenna layers. In some aspects, the antenna vias 536 may be short vertical conductors in the antenna PCB 510. FIG. 5C shows the antenna 504 with the antenna vias 536 expanded to illustrate the first conductors 504*a* of the first antenna layer and the conductors of the different second antenna layers. In some aspects, as shown in FIGS. 5B, 5D, 5E, 5G, and 5L, the antenna 504 may include first and second antenna feeds 505*a* and 505*b* (e.g., differential antenna feeds) through which the apparatus 502 may supply a current (e.g., an alternating current) to the antenna 504. In some aspects, as shown in FIGS. 5B, 5D, 5E, 5G, and 5L, the first and second antenna feeds 505*a* and 505*b* may be located at one end (e.g., a front end) of the antenna 504. In some aspects, the conductors of the first and second antenna layers and the antenna vias 536 may form a coil.

In some aspects, as shown in FIG. 5A, the first conductors 504*a* of the first antenna layer may be on a bottom surface of the antenna PCB 510. In some aspects, the first conductors 504*a* may be mounted or printed on the bottom surface of the antenna PCB 510. In some alternative aspects, the first conductors 504*a* of the first antenna layer may be in (e.g., fabricated in) a bottom layer of the antenna PCB 510. In some aspects, the first conductors 504*a* may be the only conductors on the bottom surface (or in the bottom layer) of the antenna PCB 510. In some aspects, the longitudinal axis of the receiver coil 308 of the receiver 306 may be substantially parallel to the flat, bottom surface of the antenna 504 formed by the first conductors 504*a*.

In some aspects, as shown in FIGS. 5A-5F and 5L, the first conductors 504*a* of the first antenna layer may run substantially perpendicular to the longitudinal axis of the receiver coil 308 of the receiver 306. In some aspects, a conductor may run substantially perpendicular to the longitudinal axis of the receiver coil 308 of the receiver 306 if the conductor is at an angle within a range of 75° to 105° (i.e., 90°±15°) relative to the longitudinal axis of the receiver coil 308 of the receiver 306. In some aspects, a conductor may run substantially perpendicular to the longitudinal axis of the receiver coil 308 of the receiver 306 if the conductor is at an angle within a range of 80° to 100° (i.e., 90°±10°) relative to the longitudinal axis of the receiver coil 308 of the receiver 306. In some aspects, a conductor may run substantially perpendicular to the longitudinal axis of the receiver coil 308 of the receiver 306 if the conductor is at an angle within a range of 85° to 95° (i.e., 90°±5°) relative to the longitudinal axis of the receiver coil 308 of the receiver 306.

In some aspects, as shown in FIGS. 5A-5E and 5G-5L, the conductors of the one or more second antenna layers may include second conductors 504*b*, third conductors 504*c*, a first feed conductor 504*d*, and/or a second feed conductor 504*e*. In some aspects in which the first conductors 504*a* are on the bottom surface of the antenna PCB 510, as shown in FIG. 5A, the conductors (e.g., the conductors 504*b*-504*e*) of the one or more second antenna layers may be on (e.g., mounted or printed on) an upper surface of the antenna PCB 510 and/or in (e.g., fabricated in) one or more layers of the antenna PCB 510. In some alternative aspects in which the first conductors 504*a* are in a bottom layer of the antenna PCB 510, the conductors (e.g., the conductors 504*b*-504*e*) of the one or more second antenna layers may be on (e.g., mounted or printed on) an upper surface of the antenna PCB 510 and/or in (e.g., fabricated in) one or more layers of the antenna PCB 510 other than the bottom layer of the antenna PCB 510.

In some aspects, as shown in FIGS. 5A-5E and 5G-5L, the second conductors 504*b* may run substantially perpendicular to the longitudinal axis of the receiver coil 308 of the receiver 306. In some aspects, as shown in FIG. 5A, the second conductors 504*b* may include second conductors 504*b* located at a first edge (e.g., left edge) of the antenna PCB 510 and second conductors 504*b* located at a second edge (e.g., a right edge) of the antenna PCB 510 that is opposite the first edge. In some aspects, as shown in FIGS. 5B-5E and 5G-5L, the third conductors 504*c* may connect the second conductors 504*b* to the first conductors 504*a* (e.g., by way of the antenna vias 536). In some aspects, the second and third conductors 504*b* and 504*c* (and the antenna via 536*s*) may form return paths for current supplied to the antenna 504. For example, a second conductor 504*b* and two third conductors 504*c* of one of the second antenna layers (and two antenna vias 536) may form a return path for current from one end (e.g., a front end) of one of the first conductors 504*a* to an opposite end (e.g., a rear end) of another one of the first conductors 504*a*.

In some aspects, with the antenna structure shown in FIGS. 5A-5L, after passing through one conductor of the first conductors 504*a*, the current supplied to the antenna 504 may pass through one conductor of the second conductors 504*b* before passing through another conductor of the first conductors 504*a*. In some aspects, after passing through one conductor of the second conductors 504*b*, the current supplied to the antenna 504 may pass through one conductor of the first conductors 504*a* before passing through another conductor of the second conductors 504*b*.

In some aspects, the first feed conductor 504*d* may connect electrically the first antenna feed 505*a* to a first outer conductor of the first conductors 504*a* at a first antenna end of the first outer conductor (e.g., by way of an antenna via 536), the second feed conductor 504*e* may connect electrically the second antenna feed to a second outer conductor of the first conductors at a second antenna end of the second outer conductor (e.g., by way of another antenna via 536), and the first and second antenna ends may be at opposite ends of the antenna 504. For example, the first antenna end may be a front end of the antenna 504, and the second antenna end may be a rear end of the antenna 504. In some aspects, the first and second feed conductors 504*d* and 504*e* may be in the same layer of the one or more second antenna layers. However, this is not required, and, in some alternative aspects, the first feed conductor 504*d* may be in different layer of the one or more second antenna layers than the second feed conductor 504*e*.

In some aspects, as shown in FIGS. 5A-5L, a cross-sectional area of the first conductors 504*a* in the first antenna layer may be greater than a cross-sectional area of the conductors in the one or more second antenna layers (e.g., including the second conductors 504*b*, the third conductors 504*c*, and/or the first and second feed conductors 504*d* and 504*e*). In some aspects, as shown in FIGS. 5A-5L, a width of the first conductors 504*a* in the first antenna layer may be greater than a width of the conductors in the one or more second antenna layers. In some aspects, the greater cross-sectional area and/or width of the first conductors 504*a* may be possible because the first conductors 504*a* may be the only conductors in the first antenna layer, and, therefore, the first conductors 504*a* may be spread across the entire width of the bottom surface of the antenna PCB 510. However, the greater cross-sectional area and/or width of the first conductors 504*a* is not required, and, in some alternative aspects, a cross-sectional area and/or width of the first conductors 504*a* in the first antenna layer may be equal to or less than a cross-sectional area and/or width, respectively, of the conductors in the one or more second antenna layers.

In some aspects, the first and second conductors 504*a* and 504*b* of the antenna 504 may be wires (e.g., having a round cross-section shown in FIG. 5A). However, this is not required, and, in some alternative aspects, as shown in FIGS. 5B-5L, the first and second conductors 504*a* and 504*b* of the antenna 504 may be PCB traces (e.g., flat PCB traces having a rectangular cross-section).

In some aspects, as shown in FIG. 5A, a current supplied to the antenna 504 may pass through the first conductors 504*a* in a direction opposite to a direction through which the current passes through the second conductors 504*b*. In some aspects, the opposite directions through which the current supplied to the antenna 504 passes through the first and second conductors 504*a* and 504*b* may be substantially perpendicular to the longitudinal axis of the receiver coil 308 of the receiver 306. In some aspects, the first antenna layer, which includes the first conductors 504*a*, does not include a conductor through which the current supplied to the antenna passes in a direction opposite to the direction in which the current supplied to the antenna passes through the first conductors 504*a*.

FIG. 5A shows the magnetic field generated by the electrical current carried by the first and second conductors 504*a* and 504*b* of the antenna 504 according to some aspects. In some aspects, as shown in FIG. 5A, the ferromagnetic (e.g., ferrite) layer(s) 516 may be above the antenna PCB 510 (e.g., in between the circuit component PCB 512 and the antenna PCB 510), and the ferromagnetic layer(s) 516 may contribute to the optimal performance of the apparatus 502. In some aspects, as shown in FIG. 5A, the apparatus 502 may include a first ferromagnetic strip 534 located under the second conductors 504*b* located at a first edge (e.g., a left edge) of the antenna PCB 510 and a second ferromagnetic strip 534 located under the second conductors 504*b* located at a second edge (e.g., a right edge) of the antenna PCB 510, and the first and second ferromagnetic strips 534 may further reduce unwanted magnetic field lines (e.g., magnetic field lines generated by current through the second conductors 504*b*). In some aspects, as shown in FIG. 5A, the one or more ferromagnetic strips 534 may be located underneath the second conductors 504*b* on the bottom of first conductors 504*a* of the first antenna layer.

Figure 1A:
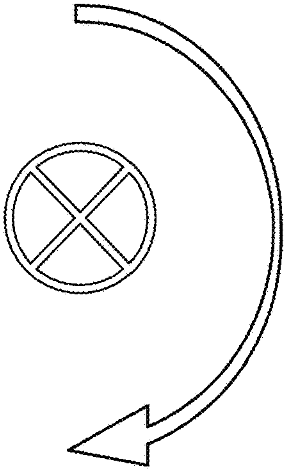
FIGS. 1A and 1B are cross-sectional views of conductors carrying electric currents in opposite directions and show the directions of the magnetic fields generated by the currents.
Figure 1B:
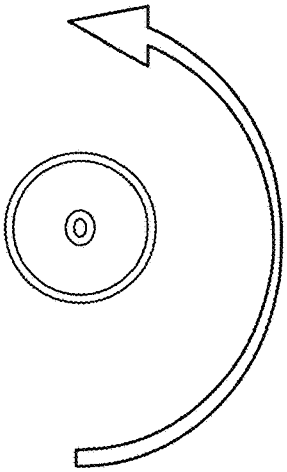
Figure 1C:
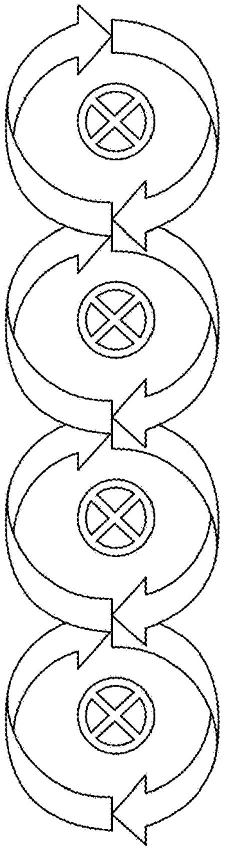
FIGS. 1C and 1D are cross-sectional views of groups of conductors each carrying an electric current in the same direction and show the directions of the magnetic fields generated by the currents.
Figure 1D:
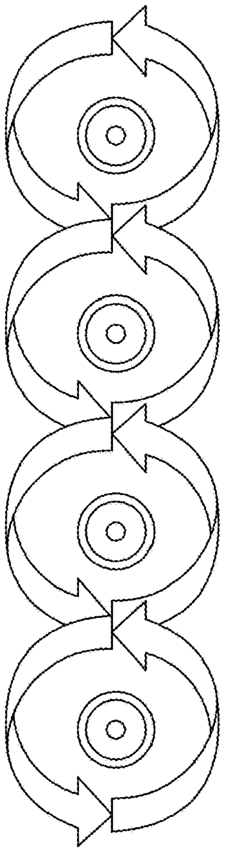
Figure 1E:
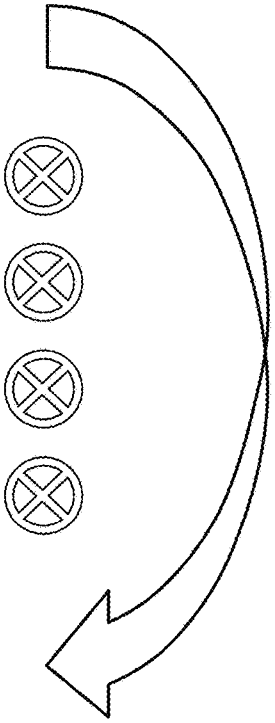
FIGS. 1E and IF are cross-sectional views of groups of conductors each carrying an electric current in the same direction and show the direction of a combined magnetic field generated by the currents of the groups of conductors.
Figure 1F:
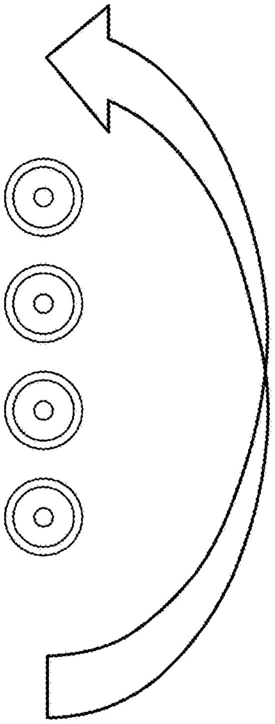
FIG. 1G is a cross-sectional view of a group of conductors including both (a) conductors carrying electric currents in a first direction and (b) conductors carrying electric currents in a second direction and shows the directions of the magnetic field generated by the opposite-direction currents of the group of conductors.
Figure 1G:
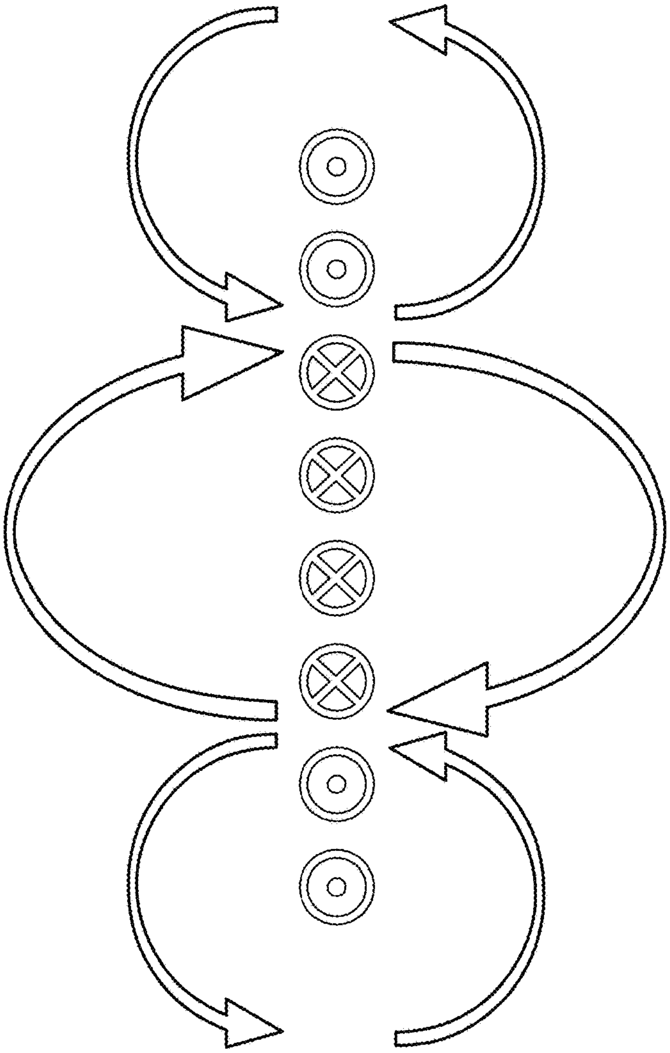
Figure 2A:
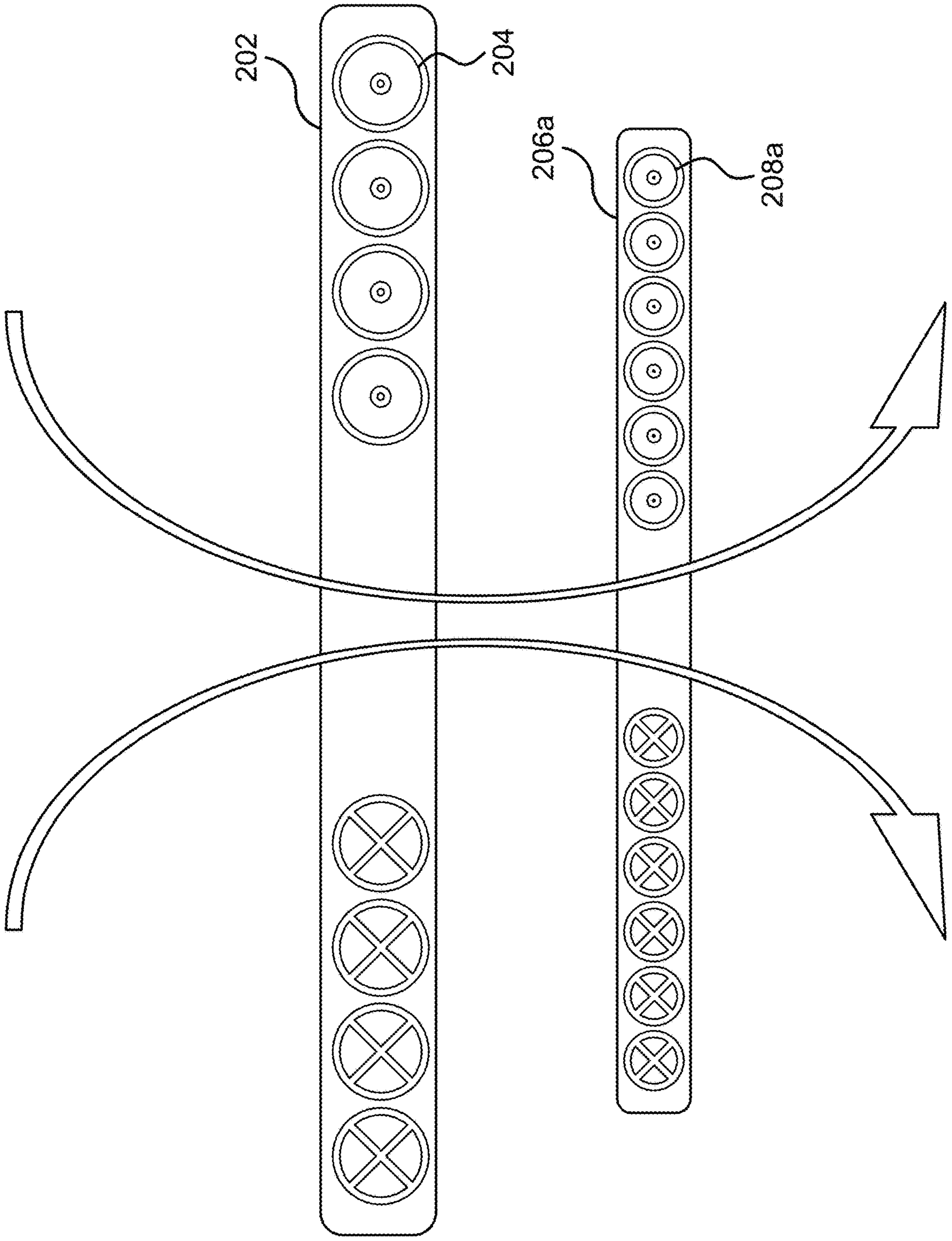
FIGS. 2A and 2B are cross-sectional views of systems including an NFC antenna and receiver having coils that are coaxially aligned and show the directions of currents carried by the transmitter coil of the NFC antenna, the direction of a magnetic field generated by the currents carried by the transmitter coil of the NFC antenna, and the direction of currents induced by the magnetic field in the receiver coil of the receiver.
Figure 2B:
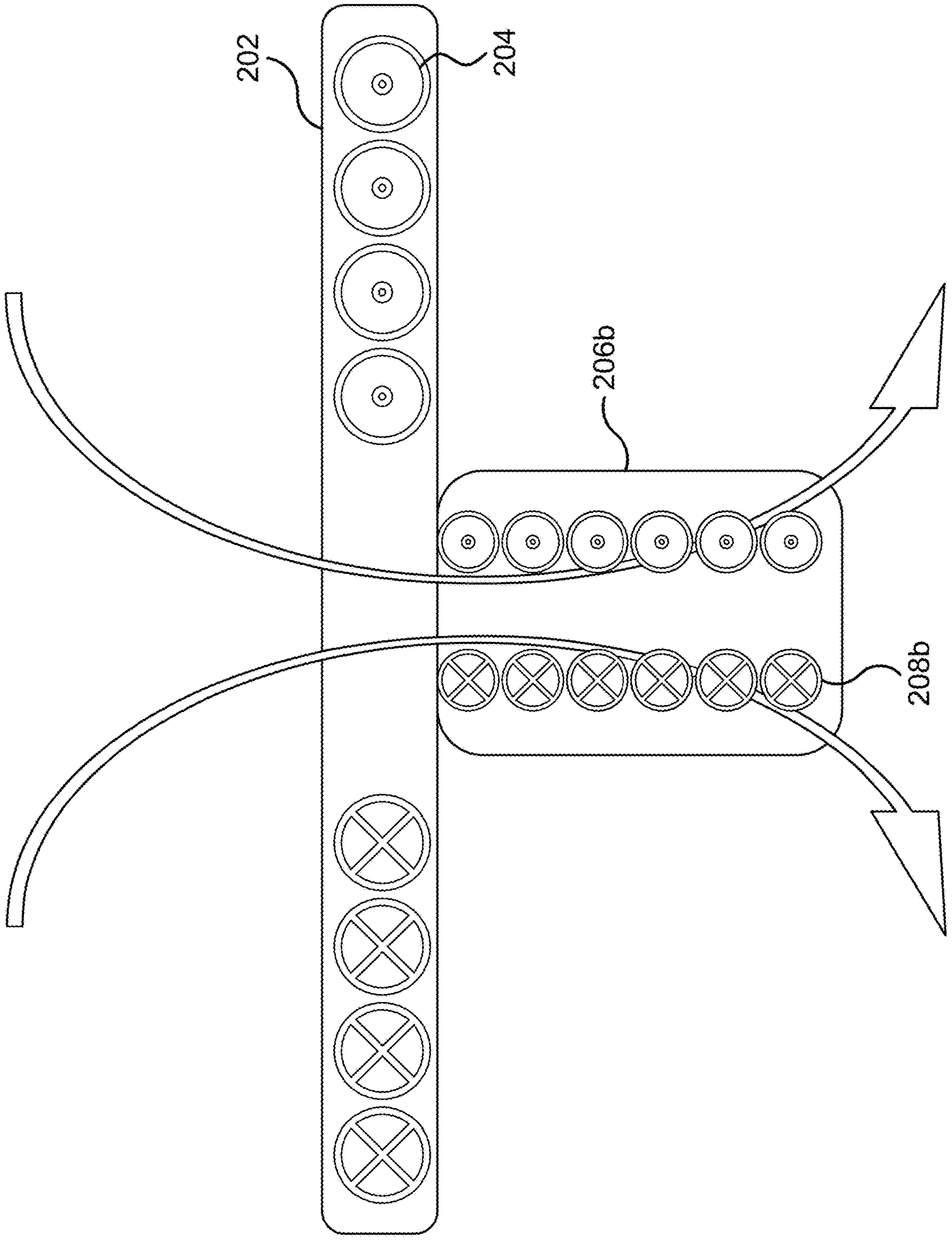
Figure 3A:
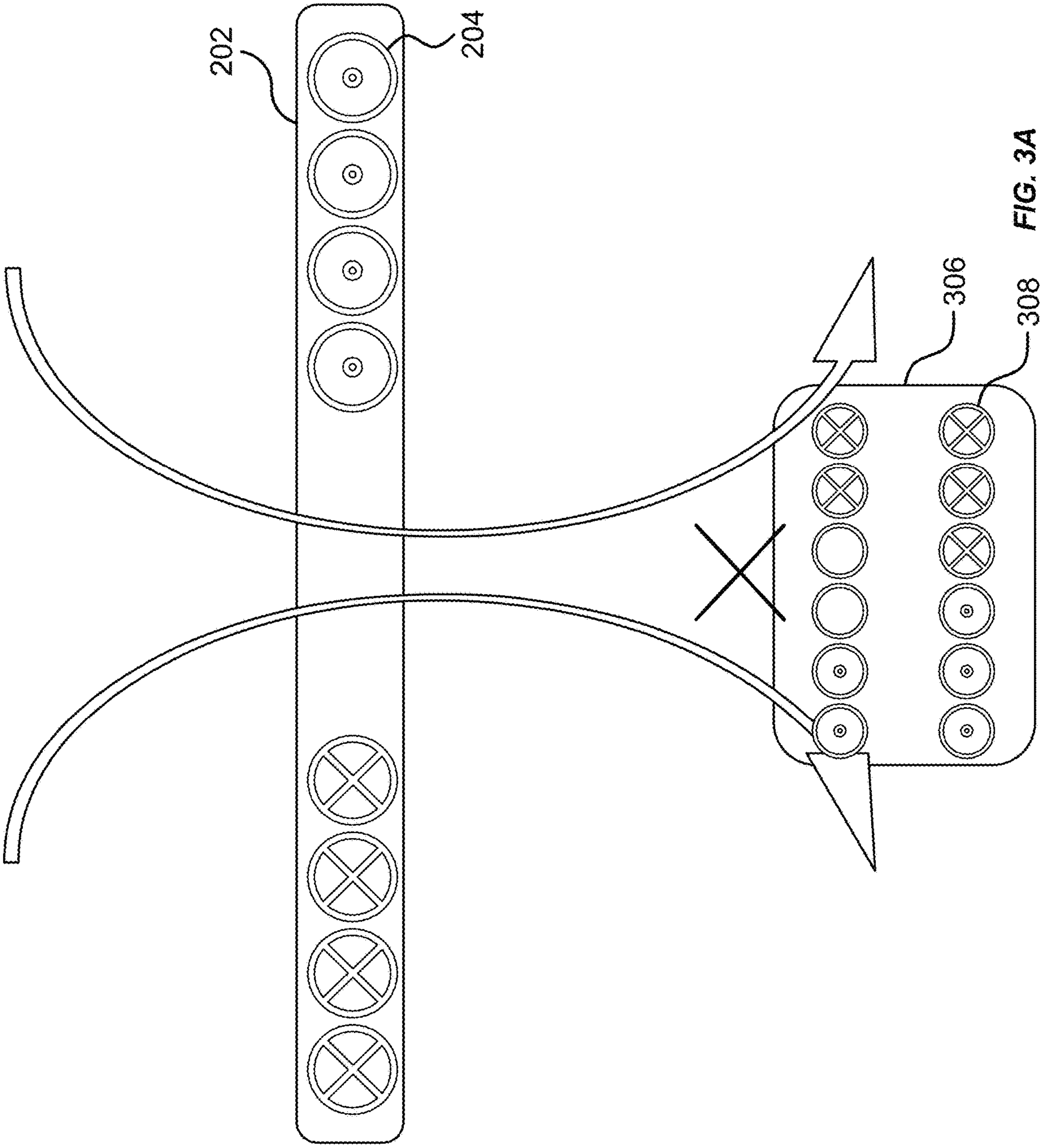
FIGS. 3A and 3B are cross-sectional views of systems including an NFC antenna having vertically-oriented transmitter coil axis and a receiver having a horizontally-oriented receiver coil axis and show the directions of currents carried by the transmitter coil of the NFC antenna, the direction of a magnetic field generated by the currents carried by the transmitter coil of the NFC antenna, and the direction of currents in the receiver coil of the receiver induced (or attempted to be induced) by the magnetic field.
Figure 3B:
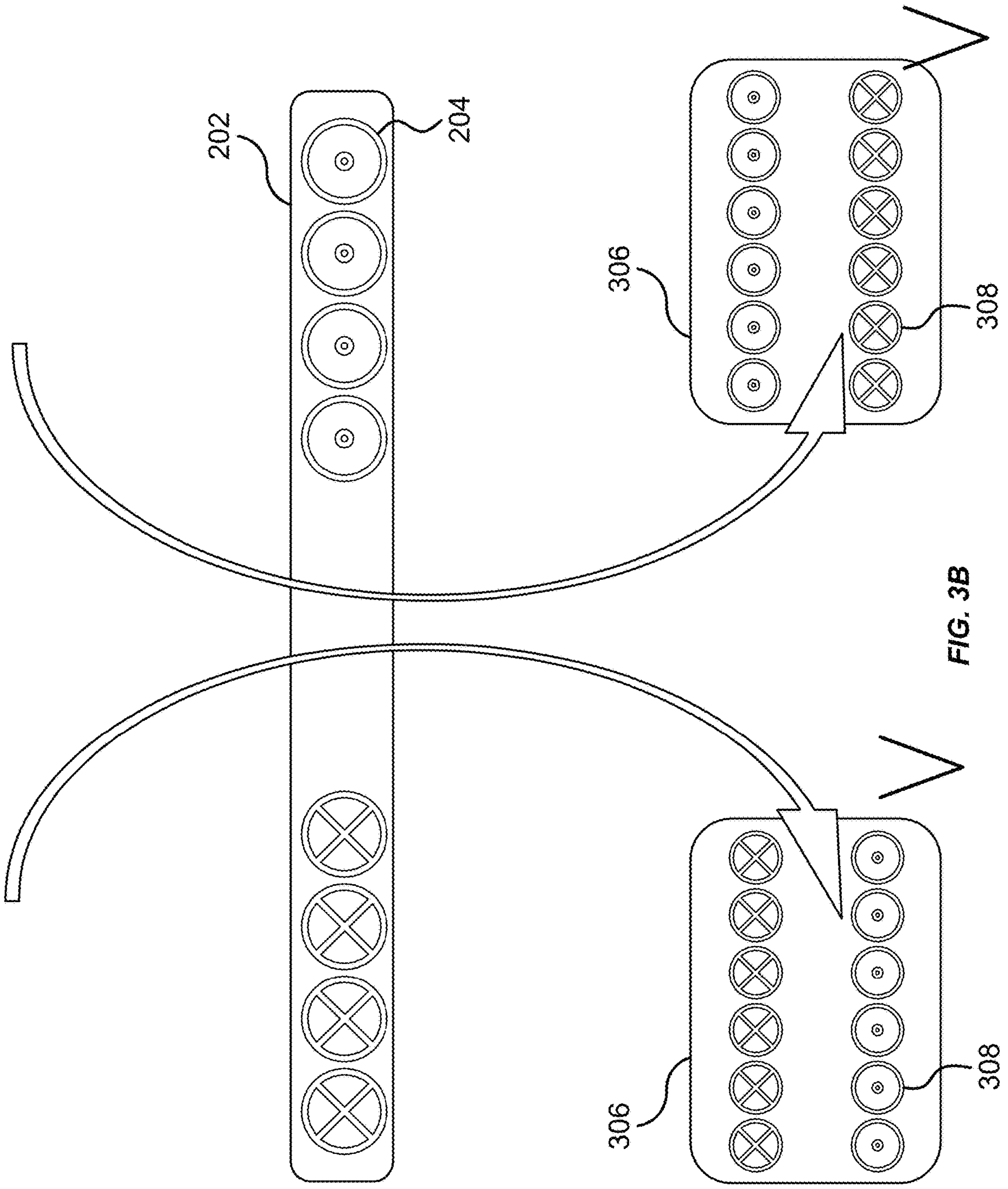
Figure 4A:
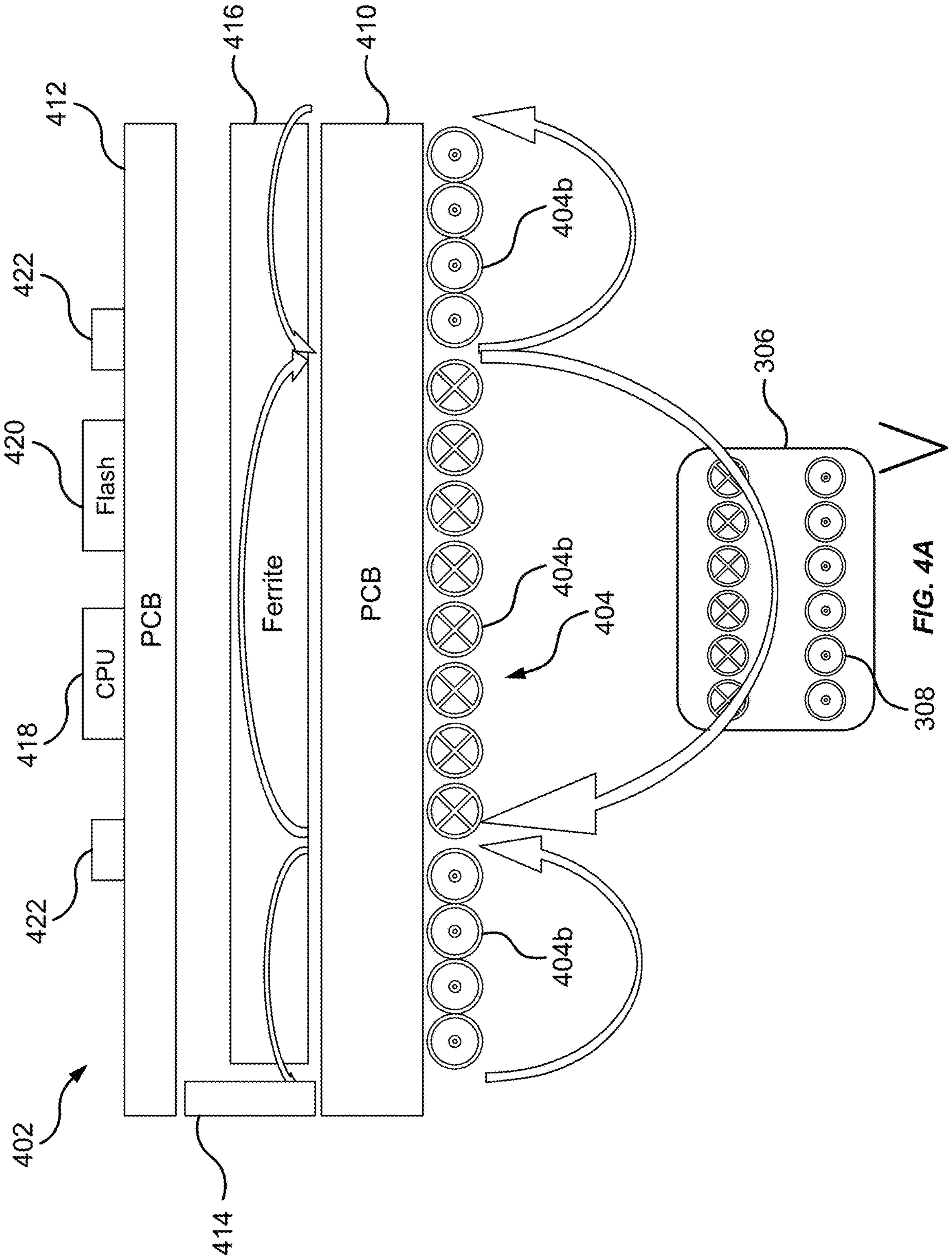
FIGS. 4A and 4C are cross-sectional views of a system including an apparatus having a flat NFC antenna with a single-layer transmitter coil and a receiver having a receiver coil.
Figure 4B:
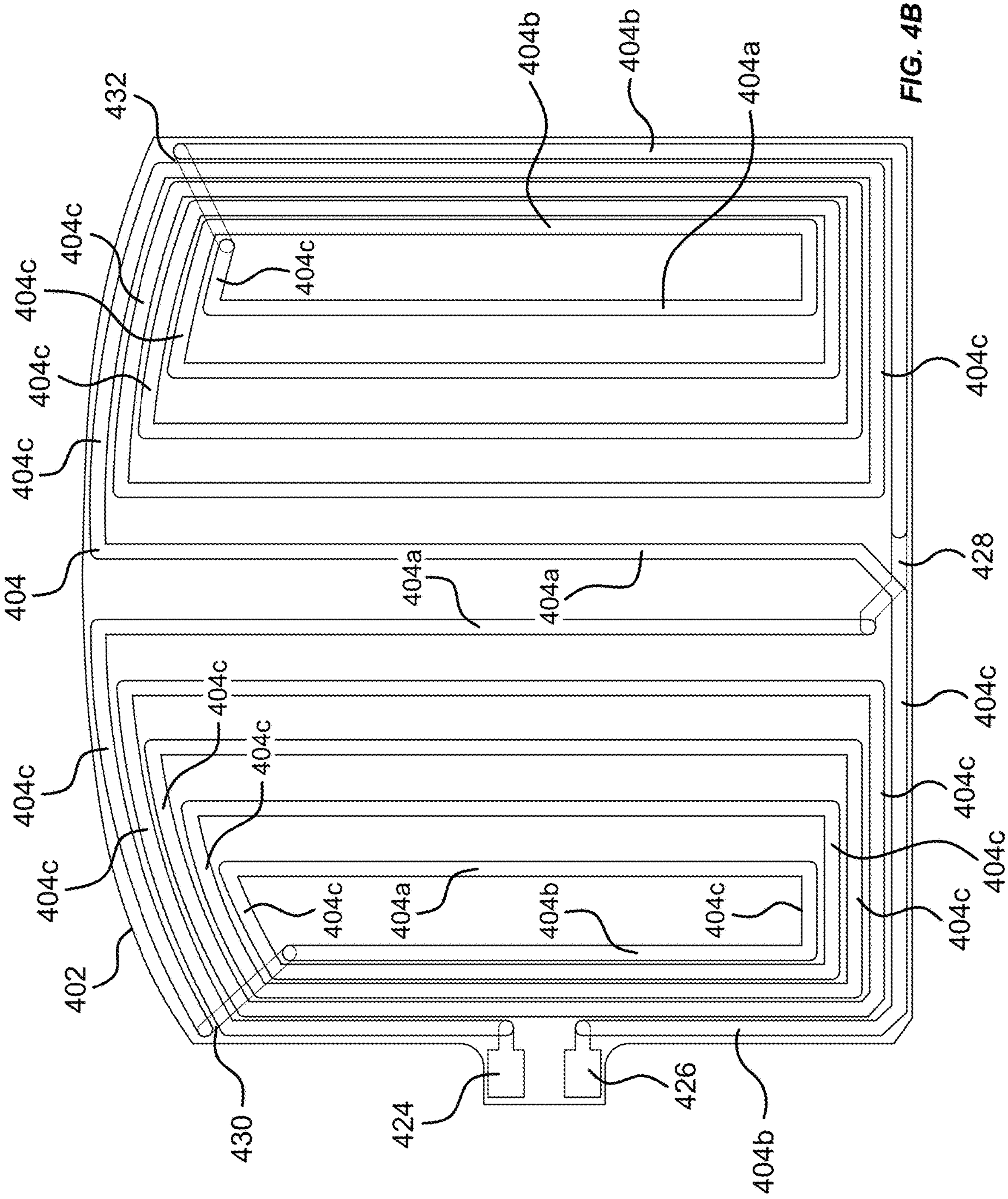
FIG. 4B illustrates the single-layer transmitter coil.
Figure 4C:
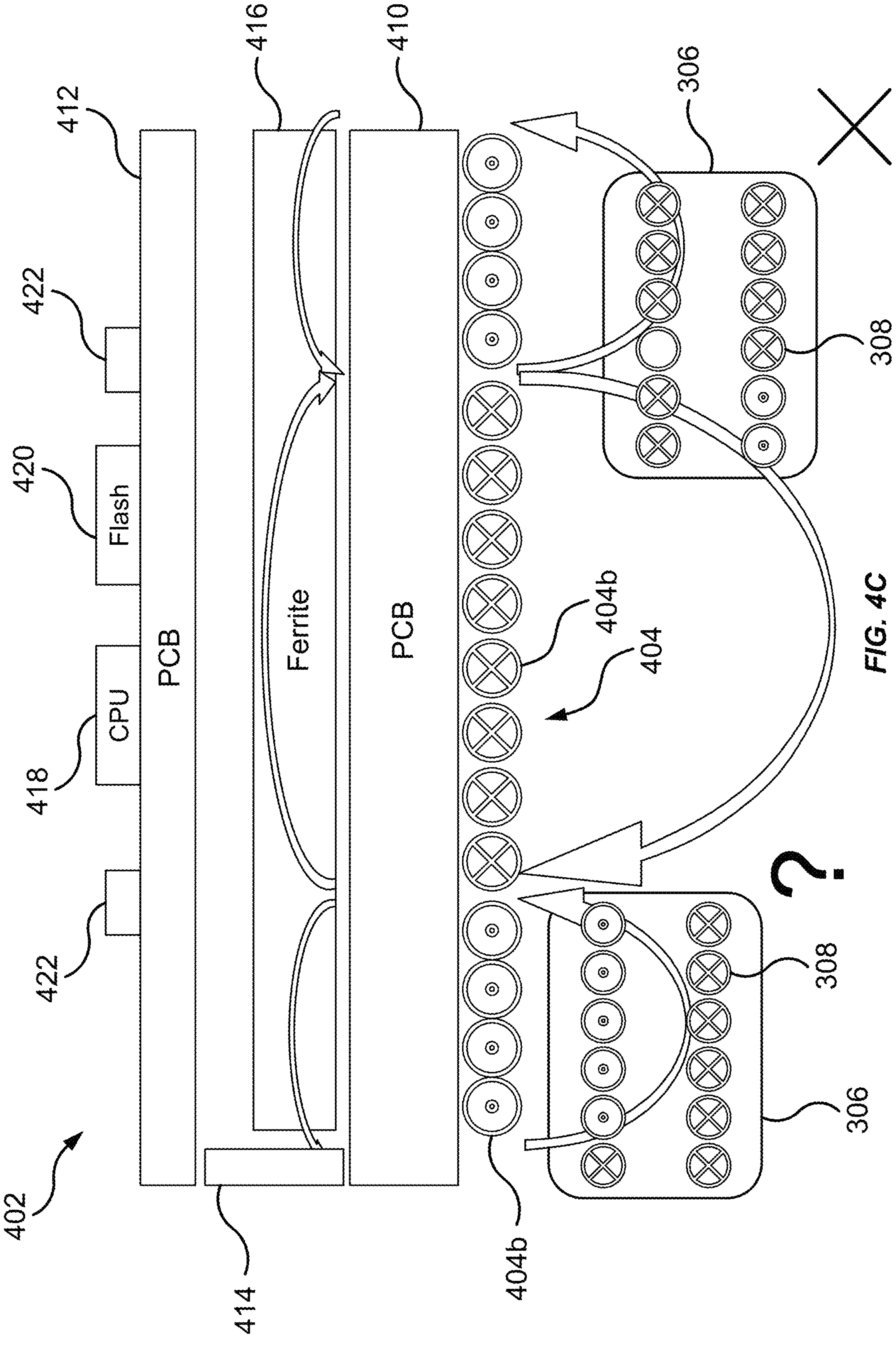

In some aspects, with the receiver 306 located at either of the locations shown in FIG. 5A, the magnetic field generated by the electrical current carried by the antenna 504 is able to induce an electrical current in the receiver coil 308 of the receiver 306. In some aspects, the receiver 306 may get a good signal underneath the antenna 504. In some aspects, the connection between the apparatus 502 and the receiver 306 of the system shown in FIG. 5A may be less sensitive to sideways movement than the connection between the apparatus 402 and the receiver 306 of the system shown in FIGS. 4A and 4C.

In some aspects, relative to the apparatus 402, more of the area of the apparatus 502 may be used to construct the antenna 504 than is used to construct the antenna 404. In some aspects, the increased area may allow a wider spacing of conductors 504*a* and, thus, a wider operational area for the NFC field.

In some aspects, relative to the first conductors 404*a* of the antenna 404 of the apparatus 402, the first conductors 504*a* of the antenna 504 may be wider than the first conductors 404*a* of the antenna 404. In some aspects, the first conductors 504*a* not being in the same antenna layer as the second conductors 504*b* may enable the first conductors 504*a* to be wider. That is, in some aspects, the wider first conductors 504*a* may take advantage of the additional space on the bottom of the antenna PCB 510. In some aspects, the wider first conductors 504*a* may provide the advantage of reduced coil resistance.

In some aspects, relative to antenna 404 of the apparatus 402, one or more additional turns may be added to one or more sides of the antenna 504. In some aspects, the additional turns may offset a decrease in inductance.

In some aspects, relative to the second conductors 404*b* of the antenna 404 of the apparatus 402, the second conductors 504*b* may be farther towards the right and left edges of the antenna 504 (e.g., because the second conductors 504*b* may be distributed in multiple second antenna layers). In some aspects, the second conductors 504*b* being farther to the right and left edges of the antenna 504 may reduce their series resistance and/or reduce their contribution to the magnetic field generated by the current provided to the antenna 504. In some aspects, relative to the antenna 404 of the apparatus 402, the third conductors 404*c* may be essentially converted to the third conductors 504*c* and antenna vias 536.

Figure 6:
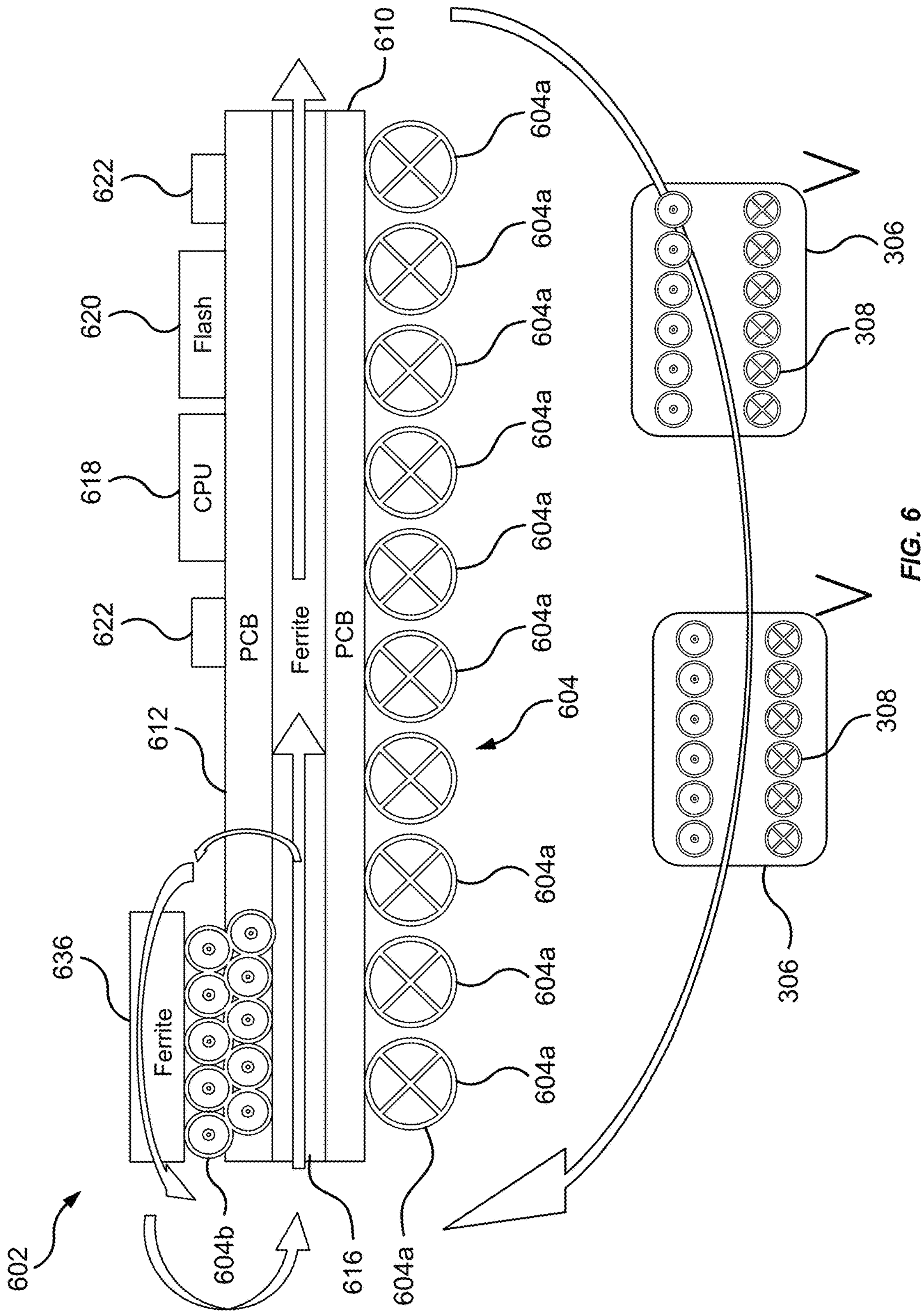
FIG. 6 is a cross-sectional view of a system including an apparatus having a flat NFC antenna with a multi-layer transmitter coil and a receiver having a receiver coil according to some aspects.

FIG. 6 is a cross-sectional view illustrating a system including an apparatus 602 and a receiver 306 according to some aspects. The receiver 306 may include a receiver coil 308. In some aspects, the apparatus 602 may include an antenna 604, a first antenna printed circuit board (PCB) 610, one or more ferromagnetic layers 616, a second antenna PCB 612, and/or one or more circuit components 618, 620, and 622 mounted on or fabricated in the second antenna PCB 612. In some aspects, the first and second antenna PCBs 610 and 612 may be part of a combined PCB (e.g., a custom PCB), and the ferromagnetic layer(s) 616 may be one or more internal layers within the combined PCB. In some alternative aspects, the ferromagnetic layer(s) 616 affixed (e.g., adhered) to a top surface of the first antenna PCB 610 and/or to a bottom surface of the second antenna PCB 612. In some aspects, the one or more circuit components 618, 620, and 622 may include a processor 618 (e.g., a CPU) and a CRM 620 (e.g., a flash memory). In some aspects, as shown in FIG. 6, the apparatus 602 may additionally include a ferromagnetic (e.g., ferrite) strip 636 located at a first edge (e.g., left or right edge) of the antenna 604 and above second conductors 604*b* of the antenna 604. However, the ferromagnetic strip 636 is not required, and, in some alternative aspects, the apparatus 602 may not include the ferromagnetic strip 636.

In some aspects, as shown in FIG. 6, the antenna 604 may include first conductors 604*a* in a first antenna layer. In some aspects, as shown in FIG. 6, the antenna 604 may include conductors in one or more second antenna layers. In the illustrated embodiments, the antenna 604 includes two second antenna layers. However, this is not required, and, in some alternative aspects, the antenna 604 may include a different number (e.g., 1, 3, 4, 5, 6, 7, 8, 12, 20, etc.) of second antenna layers. In some aspects, the antenna 604 may include antenna vias that connect electrically the first conductors 604*a* of the first antenna layer with one or more conductors of the one or more second antenna layers. In some aspects, the antenna vias may be vertical conductors in the first antenna PCB 610 and/or the ferromagnetic layer(s) 616. In some aspects, the apparatus 604 may additionally or alternatively include vias (e.g., buried vias and/or blind vias) for electronic routing (e.g., routing of one or more of the circuit components 518, 520, and 522).

In some aspects, the antenna 604 may include first and second antenna feeds (e.g., differential antenna feeds) through which the apparatus 602 may supply a current (e.g., an alternating current) to the antenna 604. In some aspects, the first and second antenna feeds may be located at one end (e.g., a front end) of the antenna 604. In some aspects, the conductors of the first and second antenna layers and the antenna vias may form a coil.

In some aspects, as shown in FIG. 6, the first conductors 604*a* of the first antenna layer may be on a bottom surface of the first antenna PCB 610. In some aspects, the first conductors 604*a* may be mounted or printed on the bottom surface of the first antenna PCB 610. In some alternative aspects, the first conductors 604*a* of the first antenna layer may be in (e.g., fabricated in) a bottom layer of the first antenna PCB 610. In some aspects, the first conductors 604*a* may be the only conductors on the bottom surface (or in the bottom layer) of the first antenna PCB 610. In some aspects, the longitudinal axis of the receiver coil 308 of the receiver 306 may be substantially parallel to the flat, bottom surface of the antenna 604 formed by the first conductors 604*a*. In some aspects, as shown in FIG. 6, the first conductors 604*a* of the first antenna layer may run substantially perpendicular to the longitudinal axis of the receiver coil 308 of the receiver 306.

In some aspects, the conductors of the one or more second antenna layers may include second conductors 604*b*, third conductors, a first feed conductor, and/or a second feed conductor. In some aspects, as shown in FIG. 6, the conductors of the one or more second antenna layers (e.g., including the second conductors 604*b*) may be on (e.g., mounted or printed on) an upper surface of the second antenna PCB 612 and/or in (e.g., fabricated in) one or more layers of the second antenna PCB 612.

In some aspects, as shown in FIG. 6, the second conductors 604*b* may run substantially perpendicular to the longitudinal axis of the receiver coil 308 of the receiver 306. In some aspects, as shown in FIG. 6, the second conductors 604*b* may be located at a one edge (e.g., a right or left edge) of the second antenna PCB 612. In some aspects, the ferromagnetic strip 636 may be located above the second conductors 604*b* at the one edge (e.g., the right or left edge) of the second antenna PCB 612. In some aspects, the third conductors may connect the second conductors 604*b* to the first conductors 504*a* (e.g., by way of the antenna vias through the second antenna PCB 612, ferromagnetic layer(s) 616, and/or first antenna PCB 610). In some aspects, the second conductors 604*b* (and the third conductors and/or the antenna via 536*s*) may form return paths for current supplied to the antenna 604. For example, a second conductor 604*b* of one of the second antenna layers may form part of a return path for current from one end (e.g., a front end) of one of the first conductors 604*a* to an opposite end (e.g., a rear end) of another one of the first conductors 604*a* (with two third conductors of the second antenna layer and/or at least two antenna vias). In some aspects, as shown by the second conductors 604*b* in FIG. 6, the return paths may all travel around the same edge (e.g., the right or left edge) of the second antenna PCB 612. In some aspects, the ferromagnetic layer(s) 616 may be located in between the first and second conductors 604*a* and 604*b*.

In some aspects, with the antenna structure shown in FIG. 6, after passing through one conductor of the first conductors 604*a*, the current supplied to the antenna 604 may pass through one conductor of the second conductors 604*b* before passing through another conductor of the first conductors 604*a*. In some aspects, after passing through one conductor of the second conductors 604*b*, the current supplied to the antenna 604 may pass through one conductor of the first conductors 604*a* before passing through another conductor of the second conductors 604*b*.

In some aspects, the first feed conductor may connect electrically the first antenna feed to a first outer conductor of the first conductors 604*a* at a first antenna end of the first outer conductor (e.g., by way of an antenna via), the second feed conductor may connect electrically the second antenna feed to a second outer conductor of the first conductors at a second antenna end of the second outer conductor (e.g., by way of another antenna via), and the first and second antenna ends may be at opposite ends of the antenna 604. For example, the first antenna end may be a front end of the antenna 604, and the second antenna end may be a rear end of the antenna 604. In some aspects, the first and second feed conductors may be in the same layer of the one or more second antenna layers. However, this is not required, and, in some alternative aspects, the first feed conductor may be in different layer of the one or more second antenna layers than the second feed conductor.

In some aspects, as shown in FIG. 6, a cross-sectional area of the first conductors 604*a* in the first antenna layer may be greater than a cross-sectional area of the conductors in the one or more second antenna layers (e.g., including the second conductors 604*b*). In some aspects, as shown in FIG. 6, a width of the first conductors 604*a* in the first antenna layer may be greater than a width of the conductors (e.g., the second conductors 604*b*) in the one or more second antenna layers. In some aspects, the greater cross-sectional area and/or width of the first conductors 604*a* may be possible because the first conductors 604*a* may be the only conductors in the first antenna layer, and, therefore, the first conductors 604*a* may be spread across the entire width of the bottom surface of the first antenna PCB 610. However, the greater cross-sectional area and/or width of the first conductors 604*a* is not required, and, in some alternative aspects, a cross-sectional area and/or width of the first conductors 604*a* in the first antenna layer may be equal to or less than a cross-sectional area and/or width, respectively, of the conductors in the one or more second antenna layers.

In some aspects, as shown in FIG. 6, the first and second conductors 604*a* and 604*b* of the antenna 604 may be wires (e.g., having a round cross-section). However, this is not required, and, in some alternative aspects, the first and second conductors 604*a* and 604*b* of the antenna 604 may be PCB traces (e.g., flat PCB traces having a rectangular cross-section).

In some aspects, as shown in FIG. 6, a current supplied to the antenna 604 may pass through the first conductors 604*a* in a direction opposite to a direction through which the current passes through the second conductors 604*b*. In some aspects, the opposite directions through which the current supplied to the antenna 604 passes through the first and second conductors 604*a* and 604*b* may be substantially perpendicular to the longitudinal axis of the receiver coil 308 of the receiver 306. In some aspects, the first antenna layer, which includes the first conductors 604*a*, does not include a conductor through which the current supplied to the antenna passes in a direction opposite to the direction in which the current supplied to the antenna passes through the first conductors 604*a*.

FIG. 6 shows the magnetic field generated by the electrical current carried by the first and second conductors 604*a* and 604*b* of the antenna 604 according to some aspects. In some aspects, as shown in FIG. 6, the ferromagnetic (e.g., ferrite) layer(s) 616 may be in between the first and second conductors 604*a* and 604*b* (e.g., in between the first and second antenna PCBs 610 and 612), and the ferromagnetic layer(s) 616 may contribute to the optimal performance of the apparatus 602. In some aspects, as shown in FIG. 6, the apparatus 602 may include a ferromagnetic strip 636 located above the second conductors 604*b* located at one edge (e.g., a left or right edge) of the second antenna PCB 612, and the ferromagnetic strip 636 may further reduce unwanted magnetic field lines (e.g., by keeping magnetic field lines generated by current through the second conductors 604*b* close to the second antenna PCB 612).

In some aspects, with the receiver 306 located at either of the locations shown in FIG. 6, the magnetic field generated by the electrical current carried by the antenna 604 is able to induce an electrical current in the receiver coil 308 of the receiver 306. In some aspects, the receiver 306 may get a good signal underneath the antenna 604. In some aspects, the connection between the apparatus 602 and the receiver 306 of the system shown in FIG. 6 may be less sensitive to sideways movement than the connection between the apparatus 402 and the receiver 306 of the system shown in FIGS. 4A and 4C.

In some aspects, relative to the apparatus 402, more of the area of the apparatus 602 may be used to construct the antenna 604 than is used to construct the antenna 404. In some aspects, the increased area may allow a wider spacing of conductors 604*a* and, thus, a wider operational area for the NFC field.

In some aspects, relative to the first conductors 404*a* of the antenna 404 of the apparatus 402, the first conductors 604*a* of the antenna 604 may be wider than the first conductors 404*a* of the antenna 404. In some aspects, the first conductors 604*a* not being in the same antenna layer as the second conductors 604*b* may enable the first conductors 604*a* to be wider. That is, in some aspects, the wider first conductors 604*a* may take advantage of the additional space on the bottom of the first antenna PCB 610. In some aspects, the wider first conductors 604*a* may provide the advantage of reduced coil resistance.

In some aspects, relative to antenna 404 of the apparatus 402, one or more additional turns may be added to one or more sides of the antenna 604. In some aspects, the additional turns may offset a decrease in inductance.

In some aspects, relative to the second conductors 404*b* of the antenna 404 of the apparatus 402, the second conductors 504*b* may be located at one edge (e.g. a right or left edge) of the antenna 604. In some aspects, the second conductors 604*b* being at the one edge of the antenna 604 may reduce their series resistance and/or reduce their contribution to the magnetic field generated by the current provided to the antenna 604. In some aspects, the second conductors 604*b* being at the one edge of the antenna 604 may allow for a smaller antenna with the same area efficiency.

In some aspects, relative to the apparatus 402, at least a portion of the top surface of the second antenna PCB 612 may be available for the one or more circuit components 618, 620, and 622, which may eliminate the need for a circuit component PCB 412 in addition to the first and second antenna PCBs 610 and 612. In some aspects, relative to the lengths of the antenna PCB 410 and the circuit component PCB 412, the lengths of the first and second antenna PCBs 610 and 612 may be shorter while maintaining the same NFC area coverage. In some aspects, relative to the overall stack of the apparatus 402 (and to the overall stack of the apparatus 502), the overall stack of the apparatus 602 may be thinner.

In some aspects, the system including the apparatus 502 or 602 and the receiver 306 may perform a process in which the antenna 504 or 604 of the apparatus 502 or 602 generates a magnetic field, which is received by the receiver coil 308 of the receiver 306. In some aspects, the apparatus 502 or 602 (e.g., the processor 518 or 618 of the apparatus 502 or 602) may perform the process. In some aspects, the process may include the apparatus 502 or 602 supplying a current to the antenna 504 or 604. In some aspects, the current supplied to the antenna 504 or 604 may pass through first conductors 504*a* or 604*a* in a first antenna layer of the antenna 504 or 604 in a direction opposite to a direction through which the current passes through second conductors 504*b* or 604*b* in one or more second antenna layers of the antenna 504 or 604 different than the first antenna layer. In some aspects, the current may be an alternating current. In some aspects, the apparatus 502 or 602 may supply the current to the antenna 504 or 604 through first and second antenna feeds (e.g., first and second antenna feeds 505*a* and 505*b*), which may be differential antenna feeds.

In some aspects, the current passing through the first conductors 504*a* or 604*a* may generate constructively overlapping magnetic fields. In some aspects, the current passing through the second conductors 504*b* or 604*b* may be a return current. In some aspects, the opposite directions through which the current passes through the first and second conductors 504*a* and 504*b* or 604*a* and 604*b* may be substantially perpendicular to a longitudinal axis of the receiver coil 308. In some aspects, the first and second conductors 504*a* and 504*b* or 604*a* and 604*b* may run in directions substantially perpendicular to a longitudinal axis of the receiver coil 308. In some aspects, a longitudinal axis of the receiver coil 308 may be parallel to a flat surface formed by the first conductors 504*a* or 604*a* in the first antenna layer.

In some aspects, by supplying the current (e.g., alternating current) to the antenna 504 or 604 to generate the magnetic field, the apparatus 502 or 602 may supply power and/or data (e.g., commands such as, for example, analyte measurement commands and/or measurement data retrieval commands) to the receiver coil 308. In some aspects, the process may additionally or alternatively include the apparatus 502 or 602 using the antenna 504 or 604 to receive data (e.g., measurement data such as, for example, light and/or temperature measurements) from the receiver coil 308 of the receiver 306.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. An apparatus comprising:
an antenna comprising:
first conductors in a first antenna layer; and
second conductors in one or more second antenna layers different than the first antenna layer, wherein a current supplied to the antenna passes through the first conductors in a direction opposite to a direction through which the current passes through the second conductors, and the current passing through the second conductors is a return current.

2. The apparatus of claim 1, further comprising an antenna printed circuit board (PCB).

3. The apparatus of claim 2, wherein the first conductors are printed on a bottom surface of the antenna PCB.

4. The apparatus of claim 2, wherein the antenna PCB comprises antenna vias, and each of the antenna vias connect electrically a conductor of the second conductors to a conductor of the first conductors.

5. The apparatus of claim 4, wherein the first conductors in the first antenna layer, conductors in the one or more second antenna layers, and the antenna vias form a coil, and the conductors in the one or more second antenna layers include at least the second conductors.

6. The apparatus of claim 2, wherein the second conductors are printed on an upper surface of the antenna PCB and/or fabricated in one or more layers of the antenna PCB.

7. The apparatus of claim 2, wherein the second conductors comprise second conductors located at a first edge of the antenna PCB and second conductors located at a second edge of the antenna PCB that is opposite the first edge.

8. The apparatus of claim 2, further comprising a ferromagnetic layer above the antenna PCB.

9. The apparatus of claim 8, further comprising:
a circuit component PCB; and
one or more circuit components mounted on or fabricated in the circuit component PCB.

10. The apparatus of claim 9, wherein the ferromagnetic layer is in between the circuit component PCB and the antenna PCB.

11. The apparatus of claim 2, wherein the second conductors are located at one edge of the antenna PCB.

12. The apparatus of claim 11, further comprising a ferromagnetic strip located above the second conductors at one edge of the antenna PCB.

13. The apparatus of claim 2, wherein the antenna further comprises a ferromagnetic layer in between the first conductors and the second conductors.

14. The apparatus of claim 1, further comprising:
first and second antenna feeds;
a first feed conductor in a layer of the one or more second antenna layers that connects electrically the first antenna feed to a first outer conductor of the first conductors at a first antenna end of the first outer conductor; and
a second feed conductor in a layer of the one or more second antenna layers that connects electrically the second antenna feed to a second outer conductor of the first conductors at a second antenna end of the second outer conductor;
wherein the first and second antenna ends are at opposite ends of the antenna.

15. The apparatus of claim 1, wherein, after passing through one conductor of the first conductors, the current supplied to the antenna passes through one conductor of the second conductors before passing through another conductor of the first conductors.

16. The apparatus of claim 1, wherein, after passing through one conductor of the second conductors, the current supplied to the antenna passes through one conductor of the first conductors before passing through another conductor of the second conductors.

17. The apparatus of claim 1, wherein the first antenna layer does not include a conductor through which the current supplied to the antenna passes in a direction opposite to the direction in which the current supplied to the antenna passes through the first conductors.

18. The apparatus of claim 1, wherein the antenna further comprises third conductors in the one or more second antenna layers, and the third conductors connect the first and second conductors.

19. The apparatus of claim 1, wherein the current passing through the first conductors generates constructively overlapping magnetic fields.

20. The apparatus of claim 1, wherein the antenna comprises two or more second antenna layers, and the second conductors are in the two or more second antenna layers.

21. A system comprising:
the apparatus of claim 1; and
a receiver coil.

22. An apparatus comprising:
an antenna comprising:
first conductors in a first antenna layer; and
second conductors in one or more second antenna layers different than the first antenna layer, wherein a current supplied to the antenna passes through the first conductors in a direction opposite to a direction through which the current passes through the second conductors;
an antenna printed circuit board (PCB), wherein the second conductors comprise second conductors located at a first edge of the antenna PCB and second conductors located at a second edge of the antenna PCB that is opposite the first edge; and
a first ferromagnetic strip located under the second conductors located at the first edge of the antenna PCB and a second ferromagnetic strip located under the second conductors located at the second edge of the antenna PCB.

23. An apparatus comprising:
an antenna comprising:
first conductors in a first antenna layer; and second conductors in one or more second antenna layers different than the first antenna layer, wherein a current supplied to the antenna passes through the first conductors in a direction opposite to a direction through which the current passes through the second conductors;

a first antenna printed circuit board (PCB), wherein the first conductors are printed on or fabricated in the first PCB antenna; and a second antenna PCB, wherein the second conductors are printed on and/or fabricated in the second PCB antenna.

24. The apparatus of claim 23, further comprising one or more circuit components mounted on or fabricated in the second antenna PCB.

25. The apparatus of claim 23, wherein the first and second antenna PCBs are part of a combined PCB, and the ferromagnetic layer is an internal layer within the combined PCB.

26. An apparatus comprising:

an antenna comprising:

first conductors in a first antenna layer; and second conductors in one or more second antenna layers different than the first antenna layer, wherein a current supplied to the antenna passes through the first conductors in a direction opposite to a direction through which the current passes through the second conductors, wherein a cross-sectional area of the first conductors is greater than a cross-sectional area of the second conductors.

27. The apparatus of claim 26, wherein the current passing through the second conductors is a return current.

28. A system comprising:

an antenna comprising:

first conductors in a first antenna layer; and second conductors in one or more second antenna layers different than the first antenna layer, wherein a current supplied to the antenna passes through the first conductors in a direction opposite to a direction through which the current passes through the second conductors; and a receiver coil, wherein the first and second conductors run in directions substantially perpendicular to a longitudinal axis of the receiver coil.

29. The system of claim 28, wherein the opposite directions through which the current passes through the first and second conductors are substantially perpendicular to the longitudinal axis of the receiver coil.

30. The system of claim 28, wherein a longitudinal axis of the receiver coil is parallel to a flat surface formed by the first conductors in the first antenna layer.

31. A method comprising:

supplying a current to an antenna, wherein the current supplied to the antenna passes through first conductors in a first antenna layer of the antenna in a direction opposite to a direction through which the current passes through second conductors in one or more second antenna layers of the antenna different than the first antenna layer, and the current passing through the second conductors is a return current.

32. The method of claim 31, wherein the current passing through the first conductors generates constructively overlapping magnetic fields.

33. A method comprising:

supplying a current to an antenna, wherein the current supplied to the antenna passes through first conductors in a first antenna layer of the antenna in a direction opposite to a direction through which the current passes through second conductors in one or more second antenna layers of the antenna different than the first antenna layer, wherein the first and second conductors run in directions substantially perpendicular to a longitudinal axis of a receiver coil.

34. The method of claim 33, wherein the current passing through the second conductors is a return current.

35. The method of claim 33, wherein the opposite directions through which the current passes through the first and second conductors are substantially perpendicular to the longitudinal axis of the receiver coil.

36. The method of claim 33, wherein the longitudinal axis of the receiver coil is parallel to a flat surface formed by the first conductors in the first antenna layer.

37. A method comprising:

supplying a current to an antenna, wherein the current supplied to the antenna passes through first conductors in a first antenna layer of the antenna in a direction opposite to a direction through which the current passes through second conductors in one or more second antenna layers of the antenna different than the first antenna layer, wherein the current is an alternating current.

* * * * *